(12) United States Patent
Qin et al.

(10) Patent No.: US 10,200,252 B1
(45) Date of Patent: Feb. 5, 2019

(54) SYSTEMS AND METHODS FOR INTEGRATED MODELING OF MONITORED VIRTUAL DESKTOP INFRASTRUCTURE SYSTEMS

(71) Applicant: Dell Software Inc., Aliso Viejo, CA (US)

(72) Inventors: Yinghua Qin, Zhuhai (CN); Zhenlei Song, Zhuhai (CN); Zhong Hong Ji, Zhuhai (CN)

(73) Assignee: Quest Software Inc., Aliso Viejo, CA (US)

( * ) Notice: Subject to any disclaimer, the term of this patent is extended or adjusted under 35 U.S.C. 154(b) by 610 days.

(21) Appl. No.: 14/858,341

(22) Filed: Sep. 18, 2015

(51) Int. Cl.
*H04L 12/24* (2006.01)
*G06F 3/0484* (2013.01)

(52) U.S. Cl.
CPC ............ *H04L 41/12* (2013.01); *G06F 3/0484* (2013.01); *H04L 41/22* (2013.01)

(58) Field of Classification Search
CPC ................................ G06F 3/0484; H04L 41/22
See application file for complete search history.

(56) References Cited

U.S. PATENT DOCUMENTS

| | | | |
|---|---|---|---|
| 3,701,971 A | 10/1972 | Sanner et al. | |
| 3,839,707 A | 10/1974 | Woodward et al. | |
| 4,468,728 A | 8/1984 | Wang | |
| 4,683,532 A | 7/1987 | Yount et al. | |
| 4,937,740 A | 6/1990 | Agarwal et al. | |
| 5,103,394 A | 4/1992 | Blasciak | |
| 5,321,838 A | 6/1994 | Hensley et al. | |
| 5,375,199 A | 12/1994 | Harrow et al. | |
| 5,432,932 A | 7/1995 | Chen et al. | |
| 5,450,586 A | 9/1995 | Kuzara et al. | |

(Continued)

FOREIGN PATENT DOCUMENTS

WO WO-2013162596 A1 10/2013

OTHER PUBLICATIONS

U.S. Appl. No. 15/201,655, Qin et al.

(Continued)

*Primary Examiner* — Jimmy H Tran
(74) *Attorney, Agent, or Firm* — Winstead PC

(57) ABSTRACT

In one embodiment, a method is performed by a computer system. The method includes, responsive to deployment of at least one component of a virtual desktop infrastructure (VDI) in a multilayer VDI architecture, creating an integrated topology model (ITM) instance of interconnected topology objects, the ITM instance comprising: a physical-and-virtual infrastructure topology model (PVI-TM) instance comprising first interconnected topology objects; a VDI topology model (VDI-TM) instance comprising second interconnected topology objects; and an access gateway topology model (AG-TM) instance comprising third interconnected topology objects. The method further includes generating dependencies between the interconnected topology objects of the ITM instance, wherein the dependencies comprise. In addition, the method includes generating a dependency graph for the multilayer VDI architecture based, at least in part, on the dependencies. Also, the method includes outputting at least a portion of the dependency graph for presentation to a user.

20 Claims, 14 Drawing Sheets

(56) References Cited

U.S. PATENT DOCUMENTS

| | | |
|---|---|---|
| 5,493,658 A | 2/1996 | Chiang et al. |
| 5,506,955 A | 4/1996 | Chen et al. |
| 5,517,629 A | 5/1996 | Boland |
| 5,528,753 A | 6/1996 | Fortin |
| 5,539,907 A | 7/1996 | Srivastava et al. |
| 5,572,640 A | 11/1996 | Schettler |
| 5,600,789 A | 2/1997 | Parker et al. |
| 5,623,598 A | 4/1997 | Voigt et al. |
| 5,649,187 A | 7/1997 | Hornbuckle |
| 5,671,351 A | 9/1997 | Wild et al. |
| 5,673,386 A | 9/1997 | Batra |
| 5,684,945 A | 11/1997 | Chen et al. |
| 5,701,137 A | 12/1997 | Kiernan et al. |
| 5,708,775 A | 1/1998 | Nakamura |
| 5,715,388 A | 2/1998 | Tsuchihashi |
| 5,715,415 A | 2/1998 | Dazey et al. |
| 5,720,018 A | 2/1998 | Muller et al. |
| 5,740,357 A | 4/1998 | Gardiner et al. |
| 5,748,881 A | 5/1998 | Lewis et al. |
| 5,752,062 A | 5/1998 | Gover et al. |
| 5,768,501 A | 6/1998 | Lewis |
| 5,872,909 A | 2/1999 | Wilner et al. |
| 5,881,306 A | 3/1999 | Levine et al. |
| 5,903,453 A | 5/1999 | Stoddard, II |
| 5,903,898 A | 5/1999 | Cohen et al. |
| 5,911,048 A | 6/1999 | Graf |
| 5,960,425 A | 9/1999 | Buneman et al. |
| 5,978,594 A | 11/1999 | Bonnell et al. |
| 5,983,366 A | 11/1999 | King |
| 5,999,734 A | 12/1999 | Willis et al. |
| 6,018,567 A | 1/2000 | Dulman |
| 6,029,170 A | 2/2000 | Garger et al. |
| 6,035,412 A | 3/2000 | Tamer et al. |
| 6,128,016 A | 10/2000 | Coelho et al. |
| 6,148,335 A | 11/2000 | Haggard et al. |
| 6,173,322 B1 | 1/2001 | Hu |
| 6,195,092 B1 | 2/2001 | Dhond et al. |
| 6,199,199 B1 | 3/2001 | Johnston et al. |
| 6,223,171 B1 | 4/2001 | Chaudhuri et al. |
| 6,243,105 B1 | 6/2001 | Hoyer et al. |
| 6,330,008 B1 | 12/2001 | Razdow et al. |
| 6,351,754 B1 | 2/2002 | Bridge, Jr. et al. |
| 6,381,628 B1 | 4/2002 | Hunt |
| 6,473,791 B1 | 10/2002 | Al-Ghosein et al. |
| 6,538,669 B1 | 3/2003 | Lagueux, Jr. et al. |
| 6,543,006 B1 | 4/2003 | Zundel et al. |
| 6,594,655 B2 | 7/2003 | Tal et al. |
| 6,622,221 B1 | 9/2003 | Zahavi |
| RE38,270 E | 10/2003 | Nakajima |
| 6,633,640 B1 | 10/2003 | Cohen et al. |
| 6,654,830 B1 | 11/2003 | Taylor et al. |
| 6,751,555 B2 | 6/2004 | Poedjono |
| 6,771,646 B1 | 8/2004 | Sarkissian et al. |
| 6,833,787 B1 | 12/2004 | Levi |
| 6,847,970 B2 | 1/2005 | Keller et al. |
| 6,901,582 B1 | 5/2005 | Harrison |
| 6,993,454 B1 | 1/2006 | Murstein et al. |
| 7,010,588 B2 | 3/2006 | Martin et al. |
| 7,103,843 B2 | 9/2006 | Hand et al. |
| 7,127,324 B2 | 10/2006 | Batori et al. |
| 7,257,635 B2* | 8/2007 | Chellis ............... G06F 9/50 709/226 |
| 7,274,375 B1 | 9/2007 | David |
| 7,363,211 B1 | 4/2008 | Naganathan et al. |
| 7,370,105 B2* | 5/2008 | Lebourg ............ H04L 41/0213 709/224 |
| 7,389,345 B1 | 6/2008 | Adams |
| 7,436,822 B2 | 10/2008 | Lee et al. |
| 7,480,647 B1 | 1/2009 | Murstein et al. |
| 7,480,866 B2 | 1/2009 | Germain et al. |
| 7,483,978 B2 | 1/2009 | Esfahany et al. |
| 7,512,888 B2 | 3/2009 | Sugino et al. |
| 7,523,128 B1 | 4/2009 | Miller et al. |
| 7,532,642 B1 | 5/2009 | Peacock |
| 7,557,803 B2 | 7/2009 | Furukawa et al. |
| 7,558,790 B1 | 7/2009 | Miller et al. |
| 7,565,610 B2 | 7/2009 | Li et al. |
| 7,587,492 B2 | 9/2009 | Dyck et al. |
| 7,620,984 B2 | 11/2009 | Kallahalla et al. |
| 7,644,397 B2 | 1/2010 | Warren et al. |
| 7,685,251 B2 | 3/2010 | Houlihan et al. |
| 7,698,683 B1 | 4/2010 | Miller et al. |
| 7,784,027 B2 | 8/2010 | Harrison |
| 7,792,941 B2 | 9/2010 | Fried et al. |
| 7,822,837 B1 | 10/2010 | Urban et al. |
| 7,882,216 B2 | 2/2011 | Houlihan et al. |
| 7,917,617 B1 | 3/2011 | Ponnapur et al. |
| 7,950,026 B1 | 5/2011 | Urbach |
| 7,962,590 B1 | 6/2011 | Or et al. |
| 7,979,245 B1 | 7/2011 | Bourlatchkov et al. |
| 8,051,162 B2 | 11/2011 | Arlitt et al. |
| 8,051,330 B2 | 11/2011 | Cinato et al. |
| 8,051,382 B1 | 11/2011 | Kingdom et al. |
| 8,103,638 B2 | 1/2012 | Voznika et al. |
| 8,103,826 B2 | 1/2012 | Kobayashi |
| 8,112,366 B2 | 2/2012 | Hollingsworth et al. |
| 8,155,996 B1 | 4/2012 | Cassone et al. |
| 8,161,058 B2 | 4/2012 | Agarwal et al. |
| 8,175,862 B1 | 5/2012 | Bourlatchkov et al. |
| 8,175,863 B1* | 5/2012 | Ostermeyer ........ G06F 17/5009 703/13 |
| 8,181,154 B2 | 5/2012 | Harrison |
| 8,185,598 B1 | 5/2012 | Golovin et al. |
| 8,203,972 B2 | 6/2012 | Sauermann |
| 8,217,945 B1 | 7/2012 | Moscovici |
| 8,239,526 B2 | 8/2012 | Simpson et al. |
| 8,255,516 B1 | 8/2012 | Zhang et al. |
| 8,307,337 B2 | 11/2012 | Chamieh et al. |
| 8,347,273 B2 | 1/2013 | Nageshappa et al. |
| 8,364,460 B2 | 1/2013 | Ostermeyer et al. |
| 8,423,646 B2 | 4/2013 | Jamjoom et al. |
| 8,438,609 B2* | 5/2013 | Cohen ................ G06F 9/45533 713/167 |
| 8,490,055 B2 | 7/2013 | Basak |
| 8,555,244 B2 | 10/2013 | Harrison |
| 8,635,498 B2 | 1/2014 | Kahana et al. |
| 8,712,950 B2* | 4/2014 | Smith .................. G06F 9/5011 706/52 |
| RE44,964 E | 6/2014 | Kymal et al. |
| 8,819,673 B1 | 8/2014 | Wilkinson et al. |
| 8,880,678 B1 | 11/2014 | Colton et al. |
| 8,892,415 B2 | 11/2014 | Bourlatchkov et al. |
| 8,902,248 B1 | 12/2014 | Bidarkar et al. |
| 8,930,395 B2 | 1/2015 | Sharma et al. |
| 8,966,036 B1 | 2/2015 | Asgekar et al. |
| 8,966,039 B1* | 2/2015 | Fultz ...................... H04L 67/16 709/223 |
| 9,075,911 B2 | 7/2015 | Mohan et al. |
| 9,274,758 B1* | 3/2016 | Qin .......................... G06F 8/60 |
| 9,288,147 B2* | 3/2016 | Kern ..................... H04L 47/125 |
| 9,497,243 B1 | 11/2016 | Binns et al. |
| 9,557,879 B1* | 1/2017 | Wang ................... G06F 3/0481 |
| 9,569,179 B1 | 2/2017 | Kachmar et al. |
| 9,811,365 B2* | 11/2017 | Borthakur ........... G06F 9/45558 |
| 9,860,139 B2* | 1/2018 | Spracklen ........... H04L 41/5009 |
| 9,882,969 B2* | 1/2018 | Reddy ..................... H04L 67/10 |
| 9,998,393 B2* | 6/2018 | Hanis ..................... H04L 47/72 |
| 10,075,459 B1* | 9/2018 | Suryanarayanan ......................... H04L 63/1425 |
| 2001/0018710 A1 | 8/2001 | Clarke et al. |
| 2002/0138659 A1 | 9/2002 | Trabaris et al. |
| 2002/0175941 A1 | 11/2002 | Hand et al. |
| 2003/0009551 A1 | 1/2003 | Benfield et al. |
| 2003/0028630 A1 | 2/2003 | Bischof et al. |
| 2003/0084155 A1 | 5/2003 | Graupner et al. |
| 2003/0097438 A1* | 5/2003 | Bearden .............. H04L 41/0213 709/224 |
| 2003/0101262 A1 | 5/2003 | Godwin |
| 2003/0126256 A1 | 7/2003 | Cruickshank et al. |
| 2003/0149753 A1 | 8/2003 | Lamb |
| 2003/0204588 A1 | 10/2003 | Peebles et al. |
| 2003/0225563 A1 | 12/2003 | Gonos |
| 2004/0006763 A1 | 1/2004 | Van De Vanter et al. |
| 2004/0012637 A1 | 1/2004 | Alford et al. |

(56) References Cited

U.S. PATENT DOCUMENTS

| | | |
|---|---|---|
| 2004/0030592 A1 | 2/2004 | Buck et al. |
| 2004/0039728 A1 | 2/2004 | Fenlon et al. |
| 2004/0046785 A1* | 3/2004 | Keller .................. G06F 9/5061 |
| | | 715/734 |
| 2004/0059812 A1 | 3/2004 | Assa |
| 2004/0064293 A1 | 4/2004 | Hamilton et al. |
| 2004/0068560 A1 | 4/2004 | Oulu et al. |
| 2004/0102925 A1 | 5/2004 | Giffords |
| 2004/0147265 A1 | 7/2004 | Kelley et al. |
| 2005/0021743 A1 | 1/2005 | Fleig et al. |
| 2005/0021748 A1 | 1/2005 | Garcea et al. |
| 2005/0044528 A1 | 2/2005 | Olsen |
| 2005/0060300 A1 | 3/2005 | Stolte et al. |
| 2005/0111352 A1 | 5/2005 | Ho et al. |
| 2005/0187750 A1 | 8/2005 | Satoh et al. |
| 2005/0198649 A1 | 9/2005 | Zakonov |
| 2005/0232227 A1 | 10/2005 | Jorgenson et al. |
| 2006/0002478 A1 | 1/2006 | Seo |
| 2006/0101340 A1 | 5/2006 | Sridhar et al. |
| 2006/0168199 A1 | 7/2006 | Chagoly et al. |
| 2006/0171334 A1 | 8/2006 | Hirata et al. |
| 2006/0173875 A1 | 8/2006 | Stefaniak |
| 2006/0235928 A1 | 10/2006 | Cacenco et al. |
| 2007/0008884 A1 | 1/2007 | Tang |
| 2007/0028239 A1 | 2/2007 | Dyck et al. |
| 2007/0043860 A1 | 2/2007 | Pabari |
| 2007/0087756 A1 | 4/2007 | Hoffberg |
| 2007/0226341 A1 | 9/2007 | Mateo |
| 2007/0250525 A1 | 10/2007 | Sanghvi et al. |
| 2007/0255805 A1 | 11/2007 | Beams et al. |
| 2007/0255814 A1 | 11/2007 | Green et al. |
| 2008/0016115 A1* | 1/2008 | Bahl ..................... H04L 41/22 |
| 2008/0077366 A1 | 3/2008 | Neuse et al. |
| 2008/0155537 A1 | 6/2008 | Dinda et al. |
| 2008/0162107 A1 | 7/2008 | Aniszczyk et al. |
| 2008/0162387 A1 | 7/2008 | Singh et al. |
| 2008/0208888 A1 | 8/2008 | Mitchell |
| 2008/0222633 A1 | 9/2008 | Kami |
| 2008/0263073 A1 | 10/2008 | Ohba et al. |
| 2008/0306711 A1 | 12/2008 | Bansal |
| 2008/0320269 A1 | 12/2008 | Houlihan et al. |
| 2009/0013281 A1* | 1/2009 | Helfman ........... G06F 17/30572 |
| | | 715/788 |
| 2009/0083276 A1 | 3/2009 | Barsness et al. |
| 2009/0119301 A1 | 5/2009 | Cherkasova et al. |
| 2009/0147011 A1 | 6/2009 | Buck et al. |
| 2009/0150538 A1 | 6/2009 | Tripathi et al. |
| 2009/0164250 A1 | 6/2009 | Hamilton et al. |
| 2009/0172666 A1 | 7/2009 | Yahalom et al. |
| 2009/0177567 A1 | 7/2009 | McKerlich et al. |
| 2009/0199177 A1 | 8/2009 | Edwards et al. |
| 2009/0204718 A1 | 8/2009 | Lawton et al. |
| 2009/0210527 A1 | 8/2009 | Kawato |
| 2009/0222558 A1 | 9/2009 | Xu et al. |
| 2009/0241108 A1 | 9/2009 | Edwards et al. |
| 2009/0271646 A1 | 10/2009 | Talwar et al. |
| 2009/0300605 A1 | 12/2009 | Edwards et al. |
| 2010/0015926 A1 | 1/2010 | Luff |
| 2010/0114554 A1 | 5/2010 | Misra |
| 2010/0125665 A1 | 5/2010 | Simpson et al. |
| 2010/0138744 A1* | 6/2010 | Kamay .................. G06F 9/452 |
| | | 715/716 |
| 2010/0153862 A1 | 6/2010 | Schreiber |
| 2010/0153916 A1 | 6/2010 | Bhatkhande et al. |
| 2010/0190509 A1 | 7/2010 | Davis |
| 2010/0223609 A1 | 9/2010 | DeHaan et al. |
| 2010/0229096 A1 | 9/2010 | Maiocco et al. |
| 2010/0241690 A1 | 9/2010 | Kurapati et al. |
| 2010/0305721 A1 | 12/2010 | Kostadinov et al. |
| 2010/0315958 A1 | 12/2010 | Luo et al. |
| 2010/0317420 A1 | 12/2010 | Hoffberg |
| 2010/0325273 A1 | 12/2010 | Kudo |
| 2011/0047496 A1 | 2/2011 | Harrison |
| 2011/0066780 A1 | 3/2011 | Bruce et al. |
| 2011/0119748 A1 | 5/2011 | Edwards et al. |
| 2011/0125800 A1 | 5/2011 | Seager et al. |
| 2011/0145380 A1 | 6/2011 | Glikson et al. |
| 2011/0153724 A1 | 6/2011 | Raja et al. |
| 2011/0161851 A1 | 6/2011 | Barber et al. |
| 2011/0187711 A1 | 8/2011 | Giovinazzi et al. |
| 2011/0197205 A1* | 8/2011 | Wagner .................. G06F 9/542 |
| | | 719/316 |
| 2011/0208827 A1 | 8/2011 | Pitkow et al. |
| 2011/0209146 A1 | 8/2011 | Box et al. |
| 2011/0254704 A1 | 10/2011 | Fournier et al. |
| 2011/0270566 A1 | 11/2011 | Sawada et al. |
| 2011/0298804 A1 | 12/2011 | Hao et al. |
| 2011/0302577 A1 | 12/2011 | Reuther et al. |
| 2012/0005148 A1 | 1/2012 | Horvitz et al. |
| 2012/0011254 A1 | 1/2012 | Jamjoom et al. |
| 2012/0023429 A1 | 1/2012 | Medhi |
| 2012/0029929 A1 | 2/2012 | Schaude et al. |
| 2012/0030346 A1 | 2/2012 | Fukuda et al. |
| 2012/0079497 A1 | 3/2012 | Gangemi et al. |
| 2012/0137367 A1 | 5/2012 | Dupont et al. |
| 2012/0166623 A1 | 6/2012 | Suit |
| 2012/0198073 A1 | 8/2012 | Srikanth et al. |
| 2012/0221314 A1 | 8/2012 | Bourlatchkov et al. |
| 2012/0222002 A1 | 8/2012 | Harrison |
| 2012/0254395 A1 | 10/2012 | Bonas |
| 2012/0254900 A1 | 10/2012 | Kumar et al. |
| 2012/0271821 A1 | 10/2012 | Qin et al. |
| 2012/0271937 A1 | 10/2012 | Cotten et al. |
| 2012/0284713 A1 | 11/2012 | Ostermeyer et al. |
| 2013/0066823 A1 | 3/2013 | Sweeney et al. |
| 2013/0080641 A1* | 3/2013 | Lui .......................... H04L 67/10 |
| | | 709/226 |
| 2013/0097580 A1 | 4/2013 | Meijer et al. |
| 2013/0159115 A1 | 6/2013 | Adams |
| 2013/0159999 A1 | 6/2013 | Chiueh et al. |
| 2013/0174127 A1 | 7/2013 | Chen et al. |
| 2013/0185433 A1 | 7/2013 | Zhu et al. |
| 2013/0211905 A1 | 8/2013 | Qin et al. |
| 2013/0212285 A1 | 8/2013 | Hoffmann et al. |
| 2013/0218547 A1 | 8/2013 | Ostermeyer et al. |
| 2013/0253718 A1* | 9/2013 | Meagher ................ G05B 13/02 |
| | | 700/291 |
| 2013/0262915 A1* | 10/2013 | Frank .................. H04L 41/0663 |
| | | 714/4.11 |
| 2013/0331963 A1* | 12/2013 | Ahangar ............ G05B 23/0272 |
| | | 700/83 |
| 2014/0006580 A1 | 1/2014 | Raghu |
| 2014/0013315 A1 | 1/2014 | Genevski et al. |
| 2014/0052712 A1 | 2/2014 | Savage et al. |
| 2014/0079297 A1 | 3/2014 | Tadayon et al. |
| 2014/0082612 A1* | 3/2014 | Breitgand ........... G06F 9/45533 |
| | | 718/1 |
| 2014/0089901 A1 | 3/2014 | Hadar |
| 2014/0092722 A1 | 4/2014 | Jain et al. |
| 2014/0108647 A1 | 4/2014 | Bleess et al. |
| 2014/0115164 A1 | 4/2014 | Kalyanaraman et al. |
| 2014/0165054 A1 | 6/2014 | Wang et al. |
| 2014/0165063 A1 | 6/2014 | Shiva et al. |
| 2014/0229934 A1* | 8/2014 | Larkin ...................... G06F 8/65 |
| | | 718/1 |
| 2014/0258872 A1* | 9/2014 | Spracklen ........... H04L 41/5009 |
| | | 715/736 |
| 2014/0269691 A1 | 9/2014 | Xue et al. |
| 2014/0279838 A1* | 9/2014 | Tsirogiannis ..... G06F 17/30292 |
| | | 707/603 |
| 2014/0304407 A1 | 10/2014 | Moon |
| 2014/0310813 A1 | 10/2014 | Murthy |
| 2014/0317261 A1 | 10/2014 | Shatzkamer et al. |
| 2014/0317293 A1 | 10/2014 | Shatzkamer |
| 2014/0337500 A1* | 11/2014 | Lee ........................ H04L 41/12 |
| | | 709/223 |
| 2014/0350888 A1 | 11/2014 | Gesmann |
| 2014/0372230 A1 | 12/2014 | Ray et al. |
| 2015/0032436 A1 | 1/2015 | van de Kamp |
| 2015/0032437 A1 | 1/2015 | Kumar et al. |
| 2015/0046212 A1 | 2/2015 | Mos |
| 2015/0052250 A1 | 2/2015 | Doganata et al. |
| 2015/0089483 A1 | 3/2015 | Guthridge |

(56) References Cited

U.S. PATENT DOCUMENTS

| | | | |
|---|---|---|---|
| 2015/0127415 A1 | 5/2015 | Showalter et al. | |
| 2015/0127815 A1 | 5/2015 | Billore et al. | |
| 2015/0134589 A1 | 5/2015 | Marrelli et al. | |
| 2015/0142457 A1 | 5/2015 | Marshall | |
| 2015/0199207 A1* | 7/2015 | Lin | G06F 9/45533 718/1 |
| 2015/0358391 A1 | 12/2015 | Moon et al. | |
| 2016/0011894 A1* | 1/2016 | Reddy | H04L 67/38 718/1 |
| 2016/0035114 A1 | 2/2016 | Hesse et al. | |
| 2016/0042296 A1 | 2/2016 | Shan et al. | |
| 2016/0048408 A1* | 2/2016 | Madhu | G06F 11/1458 718/1 |
| 2016/0094401 A1* | 3/2016 | Anwar | H04L 41/142 709/223 |
| 2016/0147522 A1 | 5/2016 | Dimitrakos et al. | |
| 2016/0191345 A1* | 6/2016 | Despotovic | H04L 41/5006 709/226 |
| 2016/0254965 A1 | 9/2016 | Maes | |
| 2016/0274948 A1* | 9/2016 | Kelly | G06F 9/5077 |
| 2016/0291942 A1 | 10/2016 | Hutchison | |
| 2016/0359872 A1* | 12/2016 | Yadav | H04L 43/04 |

OTHER PUBLICATIONS

U.S. Appl. No. 15/201,657, Qin et al.
Wood, Timothy, et al.; Middleware 2008; "Profiling and Modeling Resource Usage of Virtualized Applications"; vol. 5346 of the series Lecture Notes in Computer Science; Dec. 2008; pp. 366-387.
Liquidware Labs; "Performance Validation and Optimization"; http://www.liquidwarelabs.com/products/stratusphere-ux/performance-validation-optimization; Oct. 1, 2015; 2 pages.
Dell, Inc.; "Monitoring with User Dashboards"; vWorkspace Monitoring and Diagnostics 5.5.5—User's Guide; http://documents.software.dell.com/vworkspace-monitoring-and-diagnostics/5.6.5/users-guide/users-guide/working-with-foglight-for-virtual-desktops/monitoring-with-user-dashboards?ParentProduct=687; last revised on May 23, 2013; 4 pages.
Agrawal, Banit, et al.; "VMware View® Planner: Measuring True Virtual Desktop Experience at Scale"; VMWare Technical Journal (VMTJ), Winter 2012; Dec. 2012; pp. 69-79.
Spracklen, Lawrence, et al.; "Comprehensive User Experience Monitoring"; VMWare Technical Journal (VMTJ), Spring 2012; Mar. 2012; pp. 22-31.
U.S. Appl. No. 13/745,677, Ostermeyer.
U.S. Appl. No. 13/658,709, Wang et al.
U.S. Appl. No. 13/658,724, Wang et al.
U.S. Appl. No. 14/725,778, Chen et al.
U.S. Appl. No. 14/607,776, Qin et al.
U.S. Appl. No. 14/607,907, Qin et al.
U.S. Appl. No. 14/562,474, Rustad et al.
U.S. Appl. No. 14/249,147, Rustad et al.
U.S. Appl. No. 14/292,135, Rustad.
U.S. Appl. No. 14/619,897, Diep et al.
Aternity, Inc., "Aternity Virtual Desktop Monitoring: Get Visibility into all Tiers of the Virtual Desktop," http://www.aternity.com/products/workforce-apm/virtual-desktop-monitoring/, May 11, 2014, 2 pages.
Solarwinds Worldwide. LLC., "SolarWinds: Virtualization Manager Administrator Guide," DocVersion 6.3.0.1, Sep. 8, 2015, 321 pages.
EG Innovations, Inc., "eG Enterprise Performance Monitoring for Citrix XenDesktop: Performance Assurance for Citrix Virtual Desktops," www.eginnovations.com, accessed on Sep. 17, 2015, 2 pages.
EG Innovations, Inc., "Service Overview: VDI Performance Assessment: Move VDI Deployments from Test to Best," www.eginnovations.com, accessed on Sep. 17, 2015, 2 pages.
EG Innovations, Inc., "Total Performance Monitoring for Citrix XenApp and XenDesktop," www.eginnovations.com, accessed on Sep. 17, 2015, 2 pages.
Goliath Technologies, "Goliath Performance Monitor: for Citrix XenApp & XenDesktop," http://goliathtechnologies.com, May 2014, 2 pages.
Goliath Technologies, "Goliath Performance Monitor: for VMware," http://goliathtechnologies.com, May 2014, 2 pages.
VMTurbo, "VDI Control Module," http://vmturbo.com, Nov. 2014, 2 pages.
VMTurbo, "VMTurbo Operations Manager: Demand-Driven Control for Cloud and Virtualization," http://vmturbo.com, Jun. 2015, 2 pages.
Template Software, Workflow Template Process Template, "Developing a WFT Workflow System", 1997, whole manual.
Partridge C. et al. FIRE State Message Protocol Specification, BBN Technologies, Jul. 12, 2000, (pp. 1-19).
Newrelicblog, "Platform as a Service Meets SaaS Application Performance Management"; http://blog.newrelic.com/2011/01/13/platform-as-a-service-meets-saas-application-performance-management/; Jan. 13, 2011; 3 pages.
Quest Software, Inc.; "Instance Monitor"; Brochure, Quest Software, Inc.; 1999; 2 pages.
Boucher, Karen et al.; "Essential Guide to Object Monitors"; Mar. 1999; 263 pages (whole book).
Dewan, Prasun et al.; "A High-Level and Flexible Framework for Implementing Multiuser User Interfaces"; 1992; pp. 345-380.
Distributed Management Task Force, Inc. (DMTF); "Common Information Model (CIM) Infrastructure Specification"; Version 2.3 Final; Oct. 4, 2005; 102 pages.
Harrison, Guy; "Oracle SQL High-Performance Tuning"; ("Building a High-Performance Oracle Database Server" and "Tuning the Database Server"); Prentice-Hall, NJ; 1997; pp. 363-364 and 399-400.
Hitachi, LTD et al.; "Hitachi TPBroker User's Guide: Release 3.1"; Sep. 28, 1998; 311 pages (entire manual).
Laessig, Dirk; "Score Big with JSR 77, the J2EE Management Specification"; Javaworld; Jun. 14, 2002; 8 pages.
Muller, Nathan J.; "Focus on HP OpenView: A Guide to Hewlett-Packard's Network and Systems Management Platform"; CBM Books; 1995; 304 pages (entire book).
Savant Corporation; "Products"; http://www.savant-corp.com/prods.html, downloaded on Nov. 16, 1999; 1 page.
Savant Corporation; "Products"; http://www.savant-corp.com/prods.html, downloaded on Feb. 15, 2000; 1 page.
Savant Corporation; "Q Application Diagnostics"; http://www.savant-corp.com/qappd.html, downloaded on Nov. 16, 1999; 1 page.
Savant Corporation; "Q Hot SQL"; http://www.savant-corp.com/qhsql.html, downloaded on Nov. 16, 1999; 1 page.
Savant Corporation; "Q Instance Overview"; http://www.savant-corp.com/qiov.html, downloaded on Nov. 16, 1999; 1 page.
Savant Corporation; "Q Job Queue Manager"; http://www.savant-corp.com/qjobq.html, downloaded on Nov. 16, 1999; 1 page.
Savant Corporation; "Q Lock Manager"; http://www.savant-corp.com/qlock.html, downloaded on Nov. 16, 1999; 1 page.
Savant Corporation; "Q Replay Viewer"; http://www.savant-corp.com/qreplay.html, downloaded on Nov. 16, 1999; 1 page.
Singh, Inderjeet et al.; "Designing Web Services with J2EE 1.4 Platform JAX-RPC, SOAP, and XML Technologies"; Chapter 6 (pp. 247-289); May 2004; 46 pages.
Tang, Steven H. et al.; "Blending Structured Graphics and Layout"; ACM; Nov. 1994; pp. 167-174.
Wikimedia Foundation, Inc.; "Network Functions Virtualization"; http://en.wikipedia.org/wiki/Network_Functions_Virtualization; last modified Mar. 17, 2015; 6 pages.
NEO4J; "Network Dependency Graph"; http://www.neo4j.org/graphgist?github-neo4J . . . ; Jun. 18, 2014; 9 pages.
BMC Software, Inc.; "BMC Atrium Discovery and Dependency Mapping"; http://documents.bmc.com/products/documents/18/60/451860/451860.pdf ; 2014; 2 pages.
Grisby, Duncan; "The Power behind BMC Atrium Discovery and Dependency Mapping"; http://documents.bmc.com/products/documents/18/97/451897/451897.pdf; 2014; 5 pages.
Hewlett-Packard Development Company, L.P.; "Data Sheet: HP Universal Discovery Software"; http://h20195.www2.hp.com/V2/GetPDF.aspx/4AA4-1812ENW.pdf; Sep. 2014; 8 pages.

(56) References Cited

OTHER PUBLICATIONS

Quest Software, Inc.; "Foglight 5.6.4: Managing Dependency Mapping User Guide"; 2012; 62 pages.
Quest Software, Inc.; "Foglight 5.6.2: Managing the Dependency Mapping User Guide"; 2011; 55 pages.
Quest Software, Inc.; "Foglight APM: An Adaptive Architecture for All Environments"; 2011; 25 pages.
VFoglight Alarms: Overview—Demo 6; 2009; 31 pages.
Quest Software, Inc.; "Foglight 5.5.8: Managing Dependency Mapping User Guide"; 2011; 53 pages.
Cappelli, Will; "APM Needs Three-Layered Application Materials"; Gartner Research; Feb. 26, 2010; 5 pages.
Microsoft; "What is System Center Advisor?"; http://onlinehelp.microsoft.com/en-us/advisor/ff962512(printer).aspx; accessed on Apr. 5, 2011; 2 pages.
Microsoft; "Microsoft System Center Advisor"; https://www.systemcenteradvisor.com/; accessed on Apr. 4, 2011; 1 page.
Microsoft; "Windows Management Instrumentation (WMI): Frequently Asked Questions: Troubleshooting and Tips"; http://technet.microsoft.com/en-us/library/ee692772(d=printer).aspx; Microsoft TechNet; Jul. 28, 2004; 20 pages.
Maston, Michael; "Managing Windows with WMI"; http://technet.microsoft.com/en-us/library/bb742445(d=printer).aspx; Nov. 1, 1999; 11 pages.
Layered Technologies, Inc., "Optimized Application Performance and User Experience: Application Performance Management Service," 2013, 4 pages.
Levey, Tom, "Monitoring the Real End User Experience," www.appdynamics.com, Jul. 25, 2013, 7 pages.
Quarles, John et al.; "A Mixed Reality Approach for Merging Abstract and Concrete Knowledge"; IEEE Virtual Reality 2008; Mar. 8-12, 2008; pp. 27-34.

* cited by examiner

SYSTEMS AND METHODS FOR INTEGRATED MODELING OF MONITORED VIRTUAL DESKTOP INFRASTRUCTURE SYSTEMS

BACKGROUND

Technical Field

The present disclosure relates generally to resource monitoring and more particularly, but not by way of limitation, to systems and methods for integrated modeling of monitored computing systems.

History of Related Art

Information technology specialists, or system administrators, are responsible for maintaining, managing, protecting and configuring computer systems and their resources. More and more, such maintenance includes ensuring multiple users local and remote access to vast resources of data over a great number of computer applications and systems, including the Internet. Moreover, system administrators are asked to provide access to these highly reliable systems at practically any time of day while ensuring the system's integrity is not threatened by dataflow bottlenecks or excessive overhead.

In addition, many companies now take advantage of virtualization solutions to consolidate several specialized physical servers and workstations into fewer servers running virtual machines. Understanding the performance of a virtual infrastructure, however, is a complex challenge. Performance issues with virtual machines can be based on a variety of factors, including what is occurring within the virtual machine itself, problems with the underlying platform, problems caused by consumption of resource(s) by other virtual servers running on the same underlying platform, and/or problems of priority and allocation of resource(s) to the virtual machine(s). When seeking to ensure performance and maximize uptime, administrators often struggle to understand and monitor the virtual infrastructure, and also to quickly diagnose and resolve problems.

Many companies take advantage of virtualization solutions to consolidate several specialized physical servers and workstations into fewer servers running virtual machines. Each virtual machine can be configured with its own set of virtual hardware (e.g., processor, memory, ports, and the like) such that specialized services that each of the previous physical machines performed can be run in their native operating system. In particular, a virtualization layer, or hypervisor, allocates the computing resources of one or more host servers into one or more virtual machines and further provides for isolation between such virtual machines. In such a manner, the virtual machine is a representation of a physical machine by software.

Virtualization solutions can be adapted to provide virtual desktop computing (VDC). In VDC systems, each virtual machine can represent a virtual desktop, which can be accessed remotely by a client machine. By providing virtual desktops, VDC systems can allow users to access their applications and data from any remote computing device. VDC systems also centralize and streamline desktop administration for IT administrators.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes, responsive to deployment of at least one component of a virtual desktop infrastructure (VDI) in a multilayer VDI architecture, creating an integrated topology model (ITM) instance of interconnected topology objects, the ITM instance comprising: a physical-and-virtual infrastructure topology model (PVI-TM) instance comprising first interconnected topology objects, the first interconnected topology objects representing a plurality of monitored physical resources and a plurality of monitored virtual resources, wherein interconnections between the first interconnected topology objects reflect relationships therebetween; a VDI topology model (VDI-TM) instance comprising second interconnected topology objects, the second interconnected topology objects representing a plurality of monitored resources of a VDI solution, wherein interconnections between the second interconnected topology objects reflect relationships between the plurality of monitored resources of the VDI solution; and an access gateway topology model (AG-TM) instance comprising third interconnected topology objects, the third interconnected topology objects representing a plurality of monitored network resources that handle of VDI-related network traffic, wherein interconnections between the third interconnected topology objects reflect relationships between the plurality of monitored network resources. The method further includes generating dependencies between the interconnected topology objects of the ITM instance, wherein the dependencies comprise: a dependency of at least one of the third interconnected topology objects on at least one of the second interconnected topology objects; and a dependency of at least one of the second interconnected topology objects on at least one of the first interconnected topology objects. In addition, the method includes generating a dependency graph for the multilayer VDI architecture based, at least in part, on the dependencies. Also, the method includes outputting at least a portion of the dependency graph for presentation to a user.

In one embodiment, an information handling system includes a processor. The processor is operable to implement a method. The method includes, responsive to deployment of at least one component of a virtual desktop infrastructure (VDI) in a multilayer VDI architecture, creating an integrated topology model (ITM) instance of interconnected topology objects, the ITM instance comprising: a physical-and-virtual infrastructure topology model (PVI-TM) instance comprising first interconnected topology objects, the first interconnected topology objects representing a plurality of monitored physical resources and a plurality of monitored virtual resources, wherein interconnections between the first interconnected topology objects reflect relationships therebetween; a VDI topology model (VDI-TM) instance comprising second interconnected topology objects, the second interconnected topology objects representing a plurality of monitored resources of a VDI solution, wherein interconnections between the second interconnected topology objects reflect relationships between the plurality of monitored resources of the VDI solution; and an access gateway topology model (AG-TM) instance comprising third interconnected topology objects, the third interconnected topology objects representing a plurality of monitored network resources that handle of VDI-related network traffic, wherein interconnections between the third interconnected topology objects reflect relationships between the plurality of monitored network resources. The method further includes generating dependencies between the interconnected topology objects of the ITM instance, wherein the dependencies comprise: a dependency of at least one of the third interconnected topology objects on at least one of the second interconnected topology objects; and a dependency of at least one of the second interconnected topology objects on at least one of the first interconnected topology objects. In addition, the method includes generating a dependency graph for the multilayer VDI architecture based, at least in part, on the dependencies. Also, the method includes outputting at least a portion of the dependency graph for presentation to a user.

In one embodiment, a computer-program product includes a non-transitory computer-usable medium having computer-readable program code embodied therein. The computer-readable program code is adapted to be executed to implement a method. The method includes, responsive to deployment of at least one component of a virtual desktop infrastructure (VDI) in a multilayer VDI architecture, creating an integrated topology model (ITM) instance of interconnected topology objects, the ITM instance comprising: a physical-and-virtual infrastructure topology model (PVI-TM) instance comprising first interconnected topology objects, the first interconnected topology objects representing a plurality of monitored physical resources and a plurality of monitored virtual resources, wherein interconnections between the first interconnected topology objects reflect relationships therebetween; a VDI topology model (VDI-TM) instance comprising second interconnected topology objects, the second interconnected topology objects representing a plurality of monitored resources of a VDI solution, wherein interconnections between the second interconnected topology objects reflect relationships between the plurality of monitored resources of the VDI solution; and an access gateway topology model (AG-TM) instance comprising third interconnected topology objects, the third interconnected topology objects representing a plurality of monitored network resources that handle of VDI-related network traffic, wherein interconnections between the third interconnected topology objects reflect relationships between the plurality of monitored network resources. The method further includes generating dependencies between the interconnected topology objects of the ITM instance, wherein the dependencies comprise: a dependency of at least one of the third interconnected topology objects on at least one of the second interconnected topology objects; and a dependency of at least one of the second interconnected topology objects on at least one of the first interconnected topology objects. In addition, the method includes generating a dependency graph for the multilayer VDI architecture based, at least in part, on the dependencies. Also, the method includes outputting at least a portion of the dependency graph for presentation to a user.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
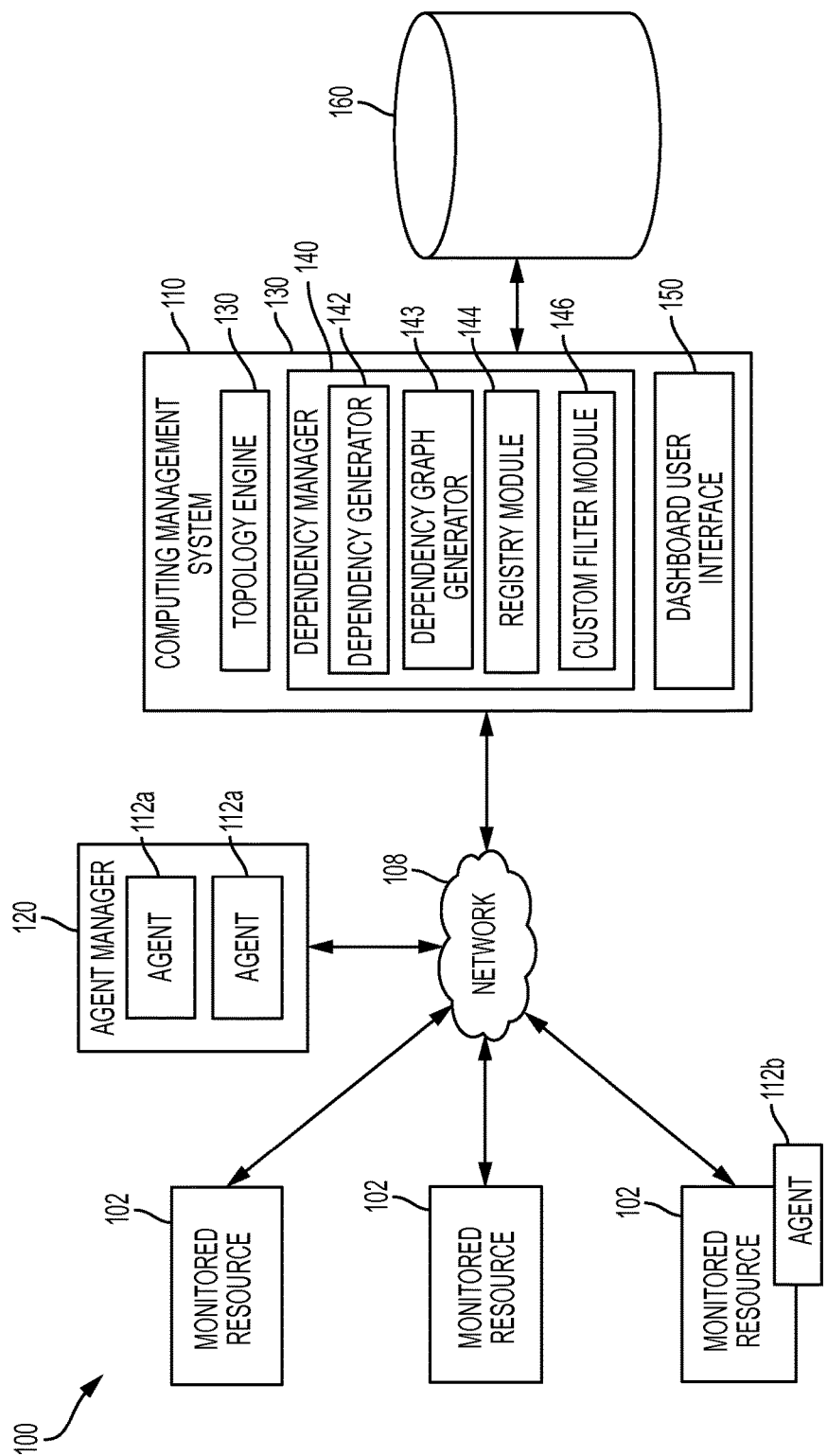
FIG. 1 illustrates an example computing environment.

Information Technology (IT) professionals often struggle to understand what infrastructure and application components actually support a given application or other resource. While the general architecture of a computing environment is rarely a complete mystery, it is equally rare that IT professionals have the full details at their fingertips. Most often, information about interactions between computing systems is out of date or incomplete, stored in a combination of spreadsheets, Microsoft Visio™ diagrams, and configuration management databases.

Furthermore, a virtual desktop infrastructure (VDI) is an infrastructure solution that enables hosting of virtual desktops and remote applications on central servers. These virtual desktops and remote applications are accessed over the network. In various embodiments, a VDI solution can include, inter alia, server virtualization, remote connection brokering and user-session control technologies. Virtual desktops and remote applications run on a server. End users view and interact with their desktops and applications over a network via a remote display protocol.

Understanding the performance of a VDI solution is a complex challenge. First, performance issues with virtual desktops and remote applications can be based on a variety of factors, including client-side network latency, server-side network latency, remote display protocol efficiency and network-compression priority. Meanwhile, a remote display problem could be caused by the underlying virtual and physical platform, the consumption and competition of resources by other virtual desktops or remote applications running on the same infrastructure. Furthermore, a virtual-desktop or virtual-application session is an instance of virtual desktop and virtual application, respectively, instantiated by user. The performance of a session instance could differ from the average performance when, for example, the client device type, device operating system, network path and execution time window are different.

One way to address the above problems might be for a user to report performance issues. Thereafter, if sufficient time is available, a VDI administrator or operator might try to manually determine a root cause of a performance problem using available information. However, such efforts are not particularly effective in determining, for example, whether there is a network-latency problem, an infrastructure problem and/or a problem related to some session-specific factor.

The present disclosure describes examples of systems and methods for identifying and tracking dependencies between components of a multi-layered computing environment that supports a VDI solution. In certain embodiments, these dependencies can enable monitoring data to be collected from physical infrastructure components, virtual infrastructure components, VDI components and other components with the full context of each component's relationship with components in other layers. By providing greater insight and transparency into dependencies, monitoring data can be classified and correlated with session-level end-to-end performance metrics, which can facilitate end-to-end performance classification and root-cause detection for performance problems.

FIG. 1 illustrates an example computing environment 100 for implementing an embodiment of a computing management system 110. The computing environment 100 includes monitored resources 102 that are monitored by the computing management system 110. The computing management system 110 can monitor the resources 102 for performance tuning reasons, troubleshooting, or other reasons. The computing management system 110 can track relationships between the resources 102 to facilitate monitoring of the resources 102.

The monitored resources 102 for which dependencies can be tracked can include physical and/or virtual computing devices, such as physical machines and/or virtual machines. Monitored resources 102 may, for instance, include devices in a data center or in a plurality of data centers. Some examples of monitored resources 102 include the following: access gateways, virtual desktops, resource pools, virtual machines, servers, web servers, application servers, databases, applications, processors, memories, hard drives or other storage devices, peripherals, software components, database tables, tablespaces in a database, application tiers, network switches and other network hardware, combinations of the same, and the like. Additional examples are provided below. The monitored resources 102 can be geographically separate or colocated.

In particular, the monitored resources 102 can belong to various functional divisions or layers. For example, the monitored resources 102 can include infrastructural resources (e.g., physical and virtual resources), components of a VDI solution that run on the infrastructural resources and an access gateway through which the VDI solution is accessed. An example of the divisions or layers will be described with respect to FIG. 3.

An agent manager 120 communicates with the computing management system 110, for example, over a network 108, which can be a local area network (LAN) and/or a wide area network (WAN, which may include the Internet). The agent manager 120 includes agents 112a, which can be hardware or software modules that collect data about the monitored resources 102 for submission to the computing management system 110. This data can include performance data, status data, configuration data, combinations of the same, or the like.

One or more topology engines 130 of the computing management system 110 can access, and in some cases create, topology models. For example, in certain embodiments, the one or more topology engines 130 can access and/or create a physical-and-virtual infrastructure topology model (PVI-TM), a VDI topology model (VDI-TM) and an access gateway topology model (AG-TM) for corresponding divisions or layers of the monitored resources 102. The PVI-TM can be a data model usable to store representations of inherent relationships between those of the monitored resources 102 relating to physical infrastructure (e.g., physical hardware for computing, storage and networking) and/or virtual infrastructure (e.g., virtual machines). The VDI-TM can be a data model usable to store representations of inherent relationships between those of the monitored resources 102 specifically relating to a VDI solution (e.g., virtual desktops, management servers, etc.). The AG-TM can be a data model usable to store representations of inherent relationships between those of the monitored resources 102 relating to handling of VDI-related network traffic from users. There may be some overlap between the models. For example, in some cases, a VDI-TM may represent a virtual machine on which a virtual desktop is implemented, which virtual machine is also represented in a corresponding PVI-TM.

In some embodiments, the computing management system 110 may receive or retrieve the PVI-TM, the VDI-TM and the AG-TM, which models may be generated by other system components. The one or more topology engines 130 can store the PVI-TM, the VDI-TM and the AG-TM in a data store 160, which can include physical computer storage, one or more databases, one or more file systems, or any combination of the same. Examples of the PVI-TM, the VDI-TM and the AG-TM will be described with respect to FIG. 5. The one or more topology engines 130 can link the PVI-TM, the VDI-TM and the AG-TM into an integrated topology model (ITM). The ITM can include the PVI-TM, the VDI-TM and the AG-TM.

The one or more topology engines 130 can create an instance of the ITM at runtime (e.g., when a virtual desktop is deployed) using a chaining discovery approach. In that way, the ITM instance can include instances of the PVI-TM, the VDI-TM and the AG-TM. Thereafter, the computing management system 110 can leverage the ITM instance to further create a dependency model that tracks dynamic relationships or dependencies between the resources 102. Dependency information can provide IT personnel with a visualization of which resources 102 affect the performance of other resources 102, other segments of an organization, etc. Troubleshooting and performance tuning can thereby be facilitated.

In each respective instance of the PVI-TM, VDI-TM and AG-TM maintained by the computing management system 110, resources from a corresponding layer or division of the monitored resources 102 can be considered an object, and data collected about each object can be stored therein. The agents 112a can collect this monitoring data (or object data) remotely by querying libraries or application programming interfaces (API) of the monitored resources 102. For example, the agents 112a can make web service calls to one or more of the monitored resources 102 to obtain monitoring data. The agents 112a can collect this monitoring data periodically, for example, according to a schedule, on-demand, or a combination of the same. Some monitored resources 102 may include one or more agents 112b installed locally with the monitored resources 102. For example, if a monitored resource 102 is a virtual machine, an agent 112b can run from within the virtual machine to obtain monitoring data.

The monitoring data may include information about attributes, characteristics, or properties of the monitored resources 102, such as the number of processors in a physical host device, memory or storage capacity, hardware or software specifications, virtual machine characteristics, and so forth. The monitoring data can also include information about the performance of the monitored resources 102. For virtual machines, this performance information may include information about characteristics as virtual machines per physical host, virtual machine memory allocations, processor load, memory load, remaining free storage, network bandwidth, network latency, or any of a variety of other parameters. This performance data can also include alarms or alerts that indicate whether certain monitored resource 102 characteristics are outside of established performance criteria.

The agents 112a, 112b provide the collected monitoring data to the computing management system 110. The computing management system 110 can include one or more physical or virtual servers that process the monitoring data. The one or more topology engines 130 can transform the monitoring data into the ITM instance. As noted above, the ITM instance typically includes the PVI-TM, VDI-TM and AG-TM instances. The PVI-TM, VDI-TM and AG-TM instances can each include a plurality of interrelated topology objects, where each topology object can represent one of the monitored resources 102. Each topology model instance can be a graph or the like, where nodes in the graph represent objects or monitored resources 102 and edges connecting the nodes represent existing relationships between the objects.

For example, a set of monitored resources 102 may include a virtual machine, a hypervisor on which the virtual machine runs and a physical host computing device upon which the hypervisor runs. The one or more topology engines 130 can transform data representing each of these monitored resources 102 into topology objects that are related to each other in the PVI-TM, VDI-TM and AG-TM by virtue of their inherent physical or virtual relationships. An inherent relationship between a virtual machine and a hypervisor, for instance, may be that the virtual machine runs on the hypervisor. Similarly, an inherent relationship between a hard disk and a physical host device may be that the hard disk is a component of the physical host device.

Figure 2:
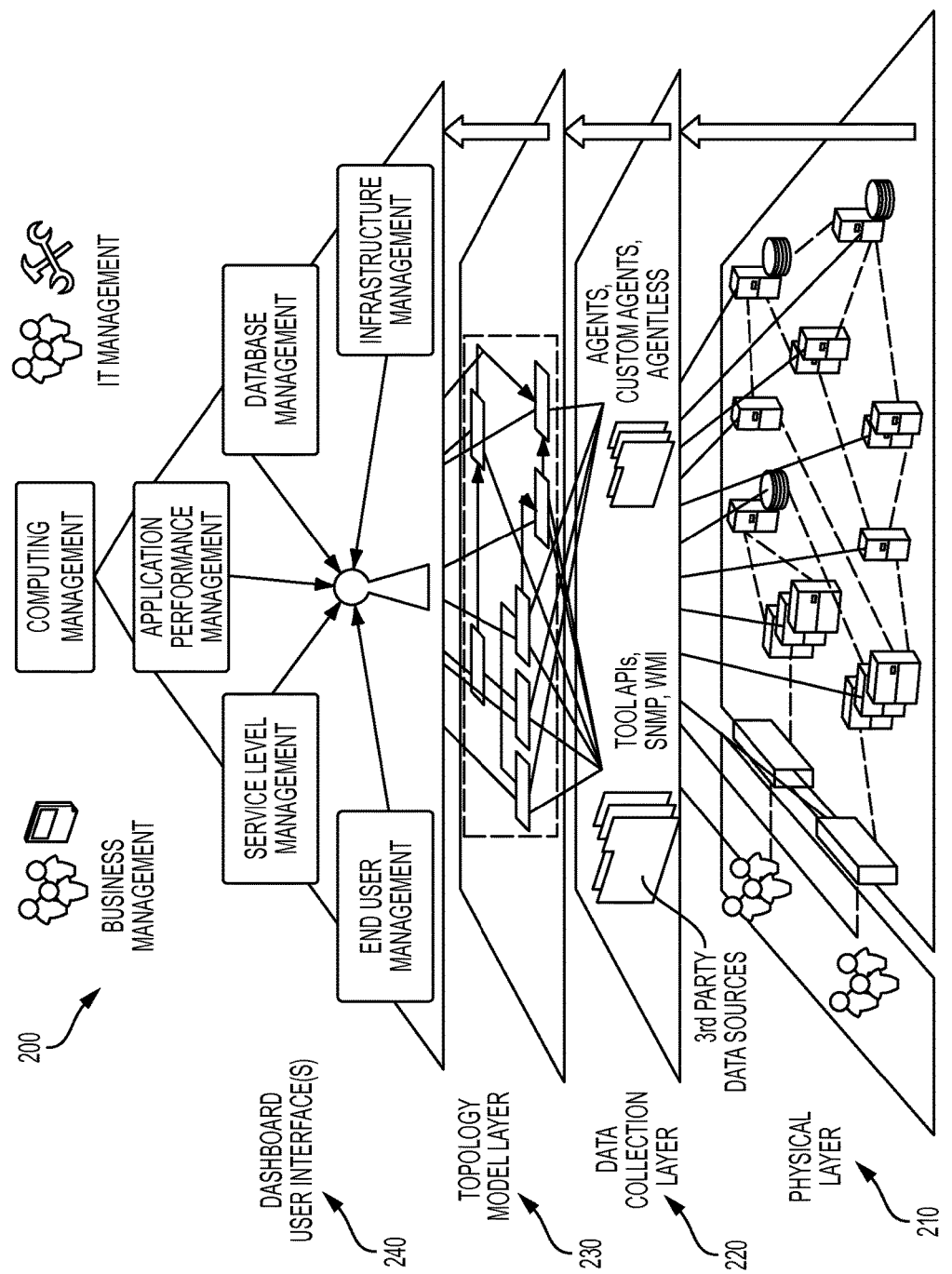
FIG. 2 illustrates an example data architecture.

In FIG. 2, an example computing management architecture 200 is shown. The computing management architecture 200 can be implemented by the computing management system 110. The computing management architecture 200 includes a resource level 210, which can include the monitored resources 102 of FIG. 1, a data collection level 220, which can include the agents 112a, 112b of FIG. 1, a topology model level 223, including an ITM instance 298 (e.g., the ITM instance described above with respect to FIG. 1), and a dashboard user interface level 240. The computing management architecture 200, as illustrated in FIG. 2, shows how information from a multilayered computing environment can be gathered from one or more monitored resources in the resource level 210 and transformed through the data collection level 220 into a real-time topology model represented by the ITM instance 298, which model is capable of dynamically representing the complex interconnected nature of the computing environment. The dashboard user interface level 240 can provide fully customizable views for conducting detailed analyses and presenting results.

The resource level 210 can encompass the multilayer computing environment being monitored. The software or hardware components (e.g., monitored resources 102) that the computing management system 110 can automatically discover can include (as a non-limiting list of examples): virtual desktops; access gateways; management servers; any device with a network address, such as an IP address; network devices, such as switches, routers and wireless access points; physical hosts or virtual hosts, including the following virtualization examples: VMware™ (ESX Servers, data centers, data stores, resource pools, clusters, virtual machines), Hyper-V™ (clusters, servers, virtual Machines), Solaris™ zones and containers, and IBM™ AIX partitions (e.g., logical partitions (LPARs), workload partitions (WPARs), or other *PARs); any process running on a server; threads within processes; web servers; Java™ and .NET™ Applications (e.g., enterprise applications and web applications); databases, such as Oracle™ and SQL Server™ databases; physical host components, such as CPU, memory and hard disk storage; and storage area network components, such as RAID arrays, controllers, Fiber channel components and SCSI components.

In the data collection level 220, as described above, agents 112 can be used for data collection. In addition, the computing management system 110 can use other sources for data collection, such as agent-less collection, third party sources (e.g., monitoring tools like IBM™ Tivoli Enterprise Console or HP™ OVO, specialized domain monitoring tools, APIs, SNMP, Windows Management Instrumentation (WMI), scripts, combinations of the same, or the like). As data is collected, the computing management system 110 can create, or build, one or more topology model instances (e.g., instances of PVI-TMs, VDI-TMs, AG-TMs, ITMs, etc.), in the topology model level 223, by transforming incoming data into a collection-independent form called a canonical data transformation. During transformation, for example, the one or more topology engines 130 of the computing management system 110 can use context data to build objects of a particular type using a respective topology model. For example, with regard to the PVI-TM instance, when collecting system data, the one or more topology engines 130 can use the name of a resource (such as a host name) to create an object for that resource with the same name as the name of the resource.

Example implementations for collecting data and creating various types of topology models are described in the following U.S. Patents and Applications, each of which is hereby incorporated by reference in its entirety: U.S. Pat. No. 7,979,245, filed May 16, 2007, titled "Model-Based Systems and Methods for Monitoring Computing Resource Performance," ("the '245 patent"), U.S. patent application Ser. No. 12/370,399 ("the '399 application"), U.S. patent application Ser. No. 13/658,709 ("the '709 application"), U.S. patent application Ser. No. 13/658,724 ("the '724 application"), U.S. patent application Ser. No. 14/607,907 ("the '907 application"). The computing management system 110 and/or agents 112 can implement some or all of the features described in the '245 patent, the '399 application, the '709 application, the '724 application and the '907 application. In some embodiments, the PVI-TM described above can be, for example, a technical infrastructure topology model as described in the '907 application. Further, in some embodiments, the PVI-TM described above can be, for example, an integration of a technical infrastructure topology model and a logical topology model as described in the '907 application.

The ITM can be leveraged to track observed dependencies between objects therein. Referring again to FIG. 1, the computing management system 110 includes a dependency manager 140 that can track dependencies. In the depicted embodiment, the dependency manager 140 includes an inter-model dependency generator 142 and a dependency graph generator. The inter-model dependency generator 142 can track observed dependencies (e.g., hardware and/or software, organizational or administrative, etc.) between model objects in a topology model.

In general, the inter-model dependency generator 142 can discover and model infrastructure and transactional dependencies. The inter-model dependency generator 142 can generate dependencies based on an analysis of the ITM instance and/or the PVI-TM, VDI-TM and AG-TM instances on which the ITM is based. In some embodiments, the ITM instance and/or the PVI-TM, VDI-TM and AG-TM instances are stored as tree abstract data types having one or more tree data structures. More generally, each topology model instance can be stored as a hierarchical data structure. The inter-model dependency generator 142 can then follow ancestor and/or descendant links in the one or more trees to infer dependency relationships among components. Dependencies can also be inferred or detected in the fashion described in the '709 application and the '724 application. In some cases, the dependencies generated by the inter-model dependency generator 142 can be stored in the data store 160.

The dependency graph generator 143 can use the generated dependencies stored in the data store 160 to generate a dependency model (e.g., a graph), which can also be stored in the data store 160. Dependencies can be output to users via the dashboard user interface module 150. For example, dependency graphs can be output to users with connections drawn between dependent components. Other views can also be used to output dependency data, including tables.

Although not shown, in some embodiments, certain monitored resources 102 or objects can be further grouped together into services. For instance, services can include logical groupings of hosts and/or other objects together based on functionality. As one example, a service can represent a web application that is implemented on one or more virtual machine hosts. Services may be user-definable, and data representing services can be stored in the topology model. A service can, for instance, be a parent object to one or more virtual host objects or other objects representing other monitored resources 102. Services provide a mechanism for users to represent their IT infrastructure in ways that mirror business views of IT.

Referring again to FIG. 1, dependencies can be output to users via the dashboard user interface module 150. For example, trees, graphs or the like could be output to users with connections drawn between dependent components. Other views can be used to output dependency data, including tables. However, in any of these views, it can be desirable to surface or present to users relevant information while suppressing less relevant information. Although dependencies can be generated or inferred between several objects in a given topology model (e.g., PVI-TM, VDI-TM, AG-TM, ITM, etc.) based on an observed dependency between two objects, outputting too many dependencies for presentation to users can produce visual clutter that can obscure more significant relationships between objects. Thus, it may be desirable to hide certain dependencies in various views. Moreover, different dependencies may be relevant to different users. Data storage administrators, for instance, may wish to see dependencies solely between physical storage components, whereas virtual machine administrators may wish to obscure such dependencies and see relationships between virtual machines instead.

Advantageously, in certain embodiments, the dependency manager 140 includes a registry module 144 and a custom filter module 146 that enable custom dependency views to be generated. The registry module 144 can provide functionality for users to annotate dependency models to specify registry variables that define exceptions to dependency models. The registry variables or exceptions can include instructions or indications that the dashboard user interface module 150 can use to modify the dependency model and/or render dependencies. The registry module 144 can provide a user interface or scripting interface that allows users to specify exceptions for excluding dependencies between operating systems 318, hypervisors 314, or any other objects from the output provided by the dashboard user interface module 150.

More generally, the registry module 144 can allow users to exclude or add any type of dependency to a dependency model. The registry module 144 can store user-specified exceptions in the data store 160. The stored exceptions can act as rendering directives that affect the dependency views rendered for output by the dashboard user interface module 150. In another embodiment, the exceptions modify the dependency model itself to break or otherwise remove unwanted dependencies (or add new dependencies).

Like the registry module 144, the custom filter module 146 can provide a mechanism for customizing dependency views. The custom filter module 146 can provide functionality for users to create custom filters that dynamically select dependencies from the dependency model based on various criteria. The custom filter module 146 can provide software or hardware tools for users to create scripts that can define the custom filters. For example, the custom filter module 146 can include a custom filter API that has routines for defining custom views of dependency data. Custom filters can accomplish some or all of the same purposes as exceptions, such as excluding certain dependencies, but may be more flexible than exceptions. Custom filters can also allow users to control the layout of objects in a dependency view. In addition, the custom filters can use the exceptions in the registry as part of the dependency data filtering process in some instances.

The registry module 144 and the custom filter module 146 can be used by a vendor or provider of the computing management system 110 to adjust dependency views. The vendor may ship or otherwise provide the computing management system 110 with one or more predefined exceptions and one or more custom filters in some cases. In other embodiments, the registry module 144 and the custom filter module 146 can also or instead be used by customers of the vendor, including administrators of the computing management system 110. Administrators can extend the functionality of the exceptions and filters provided by the vendor or may create their own exceptions and custom filters.

It should be noted that the registry variables created using the registry module 144 can be used at different times. Some registry variables, such as the example variable described above for defining object parents, can be initially used by the inter-model dependency generator 142 when building the dependency model or graph. Other registry variables, such as variables that allow parent objects to be skipped, can be accessed by the custom filter module 146 and/or dashboard user interface module 150 when generating dependency views (see, e.g., FIG. 5 below). In other embodiments, certain registry variables are accessed both by the inter-model dependency generator 142 at dependency graph build time and by the custom filter module 146 and/or dashboard user interface module 150 when generating dependency views.

Figure 3:
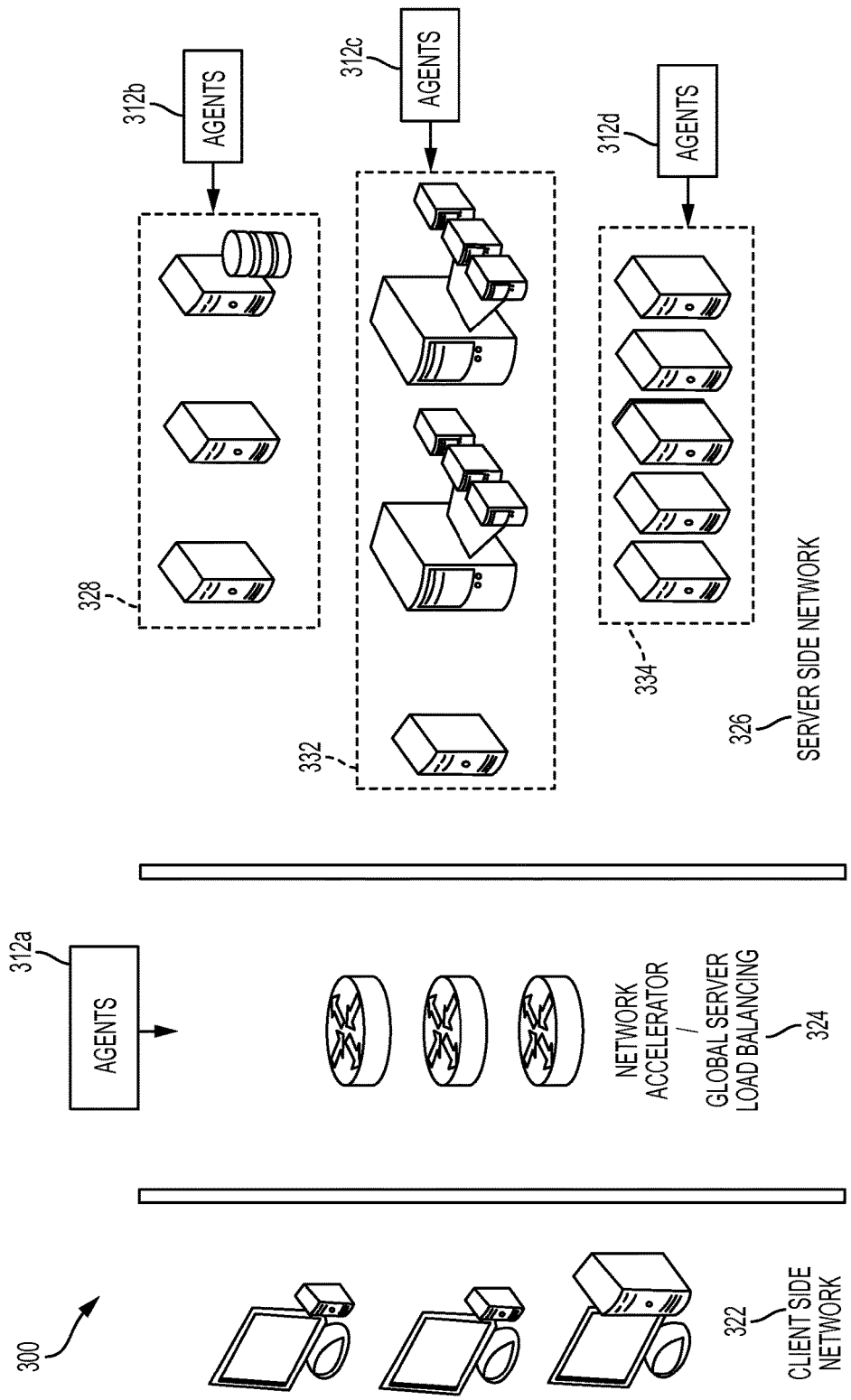
FIG. 3 illustrates an example of agent placement in a system operable to implement a VDI solution.

FIG. 3 illustrates an example of agent placement in a system 300 operable to implement a VDI solution. The system 300 includes a client-side network layer 322, an access gateway layer 324, and a server-side network layer 326. In general, the client-side network layer 322 is illustrative of user information handling systems and related networks used to access VDI-related services provided by the server-side network layer 326. The access gateway layer 324 includes components used to provide a single point of access, for example, through a corporate firewall, to the server-side network layer 326. In various embodiments, the access gateway layer 324 can include physical and/or virtual resources that provide network-acceleration and load-balancing services to the server-side network layer 326.

As illustrated, the server-side network layer 326 can include virtualization management components 328, physical and virtual infrastructure components 332 and VDI components 334. The virtualization management components 328 can include, for example, licensing servers, authentication servers (e.g., domain controllers), hypervisor management servers, combinations of same and/or the like. The physical and virtual infrastructure components 332 can include, for example, physical hosts, virtual machines, front-end servers, combinations of same and/or the like. The VDI components 334 can include, for example, VDI management servers that control and provide a management interface for virtual desktops. More specifically, the VDI management servers of the VDI components 334 can provide a network service, referred to as a broker, that is responsible for authenticating a client and providing it with an authorized list of named resources based at least partly on the client's identity and other network and security attributes. Upon requesting connectivity to a particular named resource, the broker can also be responsible for resolving the named resource to an actual network address that the client can use to establish a connection.

In certain embodiments, agents 312a, 312b, 312c and 312d can (collectively, agents 312) can reside on individual components of the system 300. For example, agents 312a can be used to collect data from individual components of the access gateway layer 324 and agents 312b, 312c and 312d can be used to collect data from individual components of the server-side network layer 326. In particular, as illustrated, the agents 312b, 312c and 312 can be resident on and collect data from the virtualization management components 328, the physical and virtual infrastructure components 332 and the VDI components 334, respectively.

Figure 4:
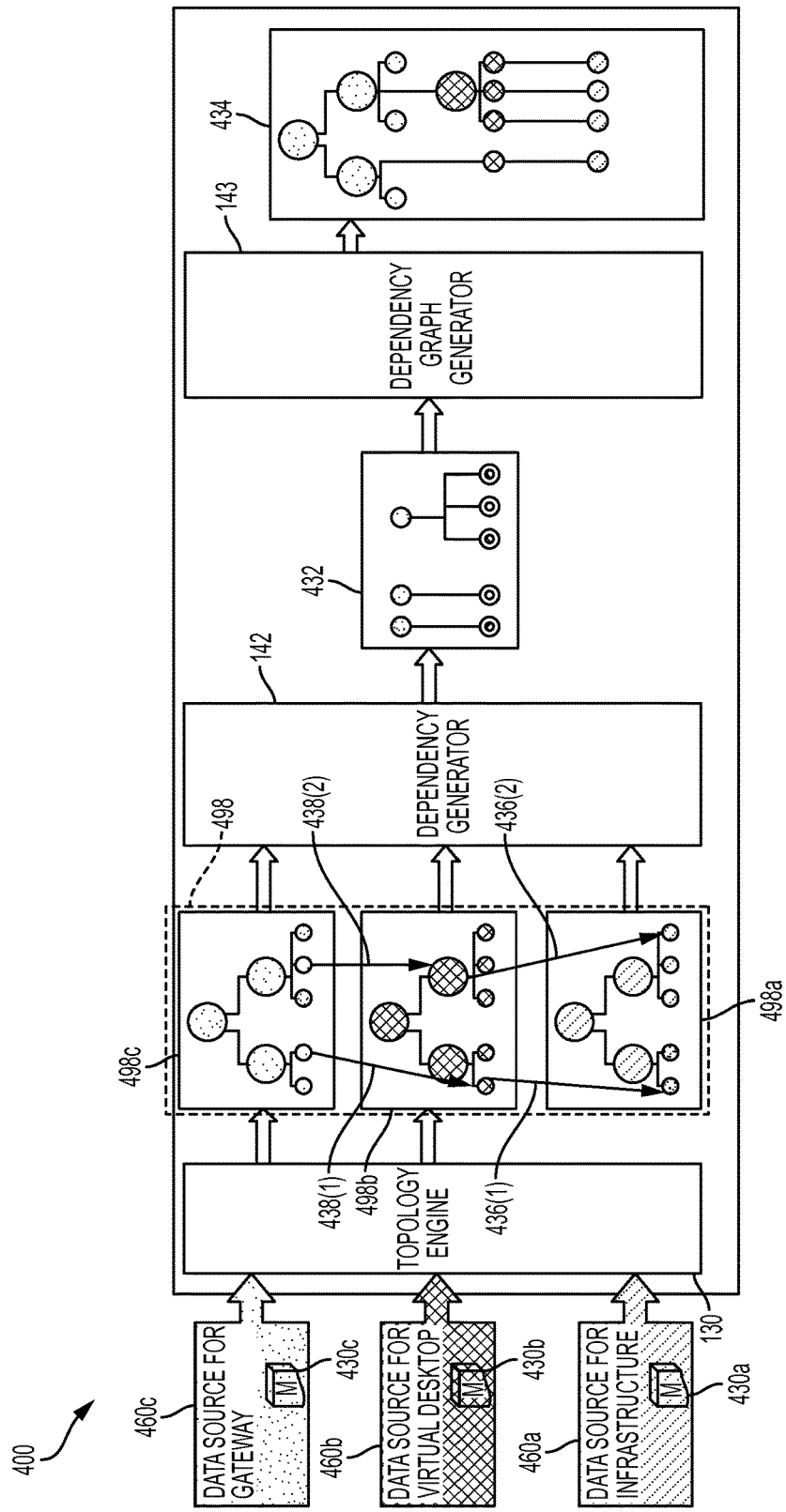
FIG. 4 illustrates example operation of a computing environment.

FIG. 4 illustrates a more detailed example 400 of operation of the computing environment 100 of FIG. 1 with specific regard to ITMs. As shown, the topology engine 130 receives a PVI-TM 430a, a VDI-TM 430b and a AG-TM 430c from data sources 460a, 460b and 460c, respectively. It should be appreciated that, in various embodiments, the data sources 460a, 460b and 460c can each be the data store 160 of FIG. 1. In these embodiments, the topology engine 130 can receive the PVI-TM 430a, the VDI-TM 430b and the AG-TM 430c from the data store 160. In general, the PVI-TM 430a, the VDI-TM 430b and the AG-TM 430c can relate to distinct layers as described with respect to FIG. 3. It should be appreciated that the topology models shown in FIG. 4 are example in nature and number. For example, in some embodiments, instead of the PVI-TM 430a as illustrated, separate topology models can be used for physical infrastructure and virtual infrastructure.

The topology engine 130 creates an ITM instance 498 from the PVI-TM 430a, the VDI-TM 430b and the AG-TM 430c. The ITM instance 498 can generally include a PVI-TM instance 498a, a VDI-TM instance 498b and a AG-TM instance 498c. In addition, the ITM instance 498 can include inter-model linking information that enables discovery, at runtime, of cross-layer dependencies between topology objects of the PVI-TM instance 498a, the VDI-TM instance 498b and the AG-TM instance 498c. For example, as shown, the ITM instance 498 includes discoverable dependencies 436(1), 436(2), 438(1) and 438(2).

The inter-model dependency generator 142 generates dependencies between the interconnected objects of the ITM instance 498. For example, in the illustrated embodiment in which the PVI-TM instance 498a, the VDI-TM instance 498b and the AG-TM instance 498c are represented as trees, the inter-model dependency generator 142 can traverse each topology model in depth-first fashion to generate internal dependencies within each instance. In addition, the inter-model dependency generator 142 can generate cross-layer dependencies using the inter-model linking information. In general, the inter-model dependency generator 142 can produce a collection of dependencies 432.

The dependency graph generator 143 can generate a dependency graph or model 434 that depicts the collection of dependencies 432 in the fashion described above. The dependency graph or model 434 can serve as the basis for a monitoring dashboard such as monitoring dashboards provided by the dashboard user interface module 150 of FIG. 1. The collection of dependencies 432 can be updated, for example, in response to change notifications to add specific dependencies or to remove specific dependencies. In addition, in some cases, dependencies can be refreshed, for example, by deleting the collection of dependencies 432 and re-running a discovery process. Example operation of the inter-model dependency generator 142 and the dependency graph generator 143 will be described in greater detail in relation to FIGS. 14-15.

Figure 5:
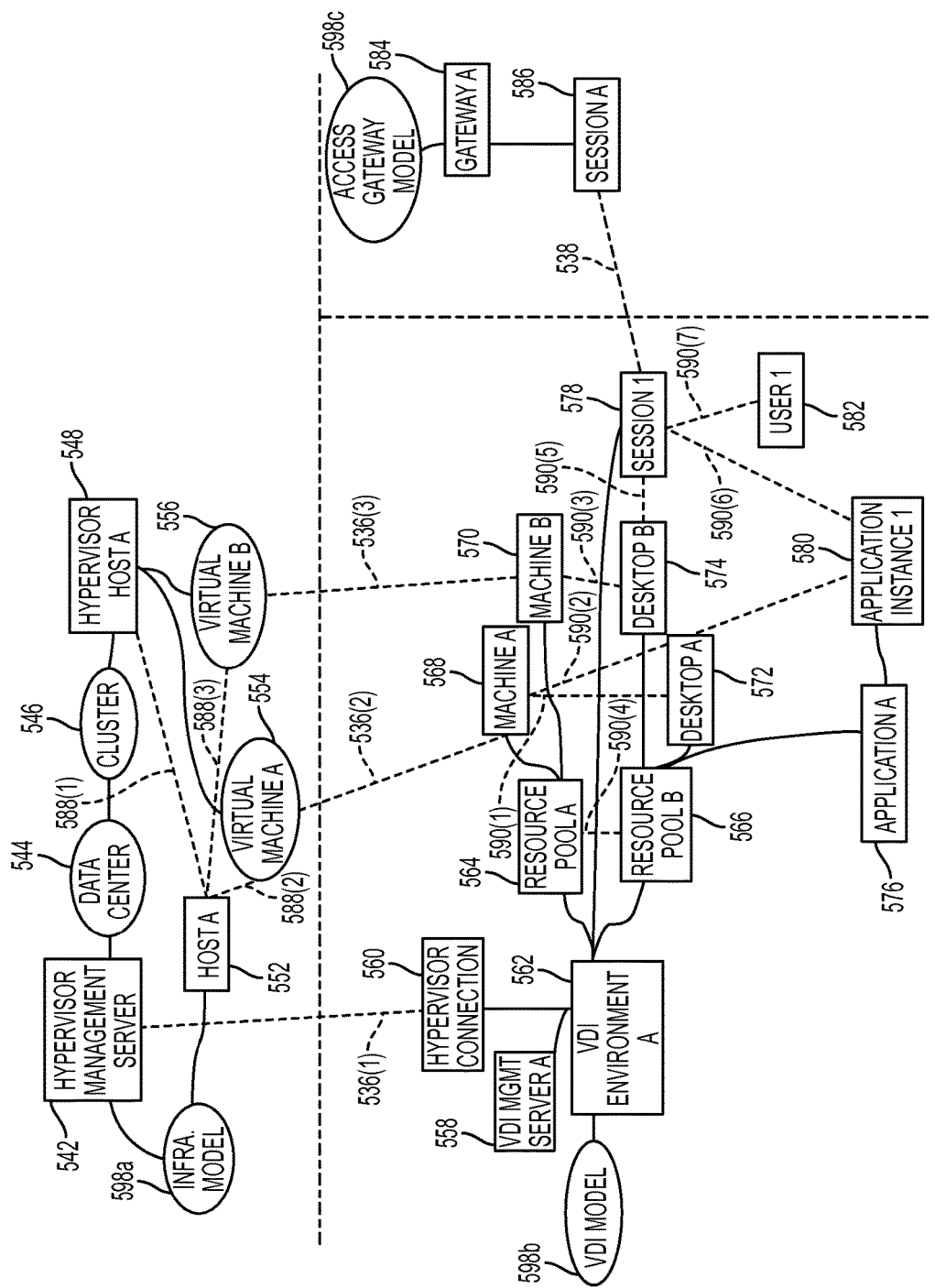
FIG. 5 illustrates an example of an integrated topology model (ITM) instance.

FIG. 5 illustrates an example of an ITM instance 598. The ITM instance 598 relates together a PVI-TM instance 598a, a VDI-TM instance 598b and an AG-TM instance 598c. The PVI-TM instance 598a, the VDI-TM instance 598b and the AG-TM instance 598c each include interrelated topology objects that are instances of object types defined by a corresponding PVI-TM, VDI-TM and AG-TM, respectively, of the type described above. In the illustrated embodiment, dashed lines indicate dependencies realized at runtime, for example, when a given component (e.g., a virtual machine) is deployed.

The PVI-TM instance 598a is shown to include a plurality of interrelated topology objects, specifically, a hypervisor management server object 542, a data center object 544, a cluster object 546, a hypervisor host object 548, a physical host object 552, a virtual machine object 554 and a virtual machine object 556, each of which represents an instance of a corresponding object type defined by the PVI-TM. For example, the virtual machine object 554 and the virtual machine object 554 can each be an instance of a virtual machine object defined by a PVI-TM.

More particularly, the hypervisor host modeled by the hypervisor host object 548 is shown to be part of a compute cluster represented by the cluster object 546, which cluster is part of a data center represented by the data center object 544, which data center is managed by a management server represented by the hypervisor management server object 542. The virtual machine objects 554 and 556 each represent a virtual machine that is managed by a hypervisor which executes on a hypervisor host modeled by the hypervisor host object 548.

At runtime, when physical and virtual infrastructure components of the PVI-TM instance 598a are deployed, runtime dependencies can be realized. For example, when the physical host modeled by the physical host object 552 is brought online to host virtual machines managed by the hypervisor host modeled by the hypervisor host object 548, a runtime dependency 588(1) can be discovered between the physical host object 552 and the hypervisor host object 548. When the virtual machine modeled by the virtual machine object 554 is deployed on the physical host modeled by the physical host object 552, a runtime dependency 588(2) can be discovered between the virtual machine object 554 and the physical host object 552. In similar fashion, when the virtual machine modeled by the virtual machine object 556 is deployed on the physical host modeled by the physical host object 552, a runtime dependency 588(3) can be discovered between the virtual machine object 556 and the physical host object 552.

The VDI-TM instance 598b is shown to include a plurality of interrelated topology objects, specifically, a VDI management server object 558, a hypervisor connection object 560, a VDI environment object 562, a resource pool object 564, a resource pool object 566, a machine object 568, a machine object 570, a virtual desktop object 572, a virtual desktop object 574, a virtual application object 576, a session object 578, virtual application instance object 580 and a user object 582.

The VDI management server object 558 models a server computer that provides a management interface to a VDI environment modeled by the VDI environment object 562. The hypervisor connection object 560 models a connection to a hypervisor that manages the VDI environment modeled by the VDI environment object 562. The VDI environment modeled by the VDI environment object 562 is shown to include respective resource pools modeled by the resource pool object 564 and the resource pool object 566.

Each resource pool can include, for example, a collection of virtual machines, physical machines, virtual desktops, virtual applications, and/or other resources that are managed as a single entity. For example, the resource pool modeled by the resource pool object 564 is shown to include machines represented by the machine object 568 and the machine object 570. In some embodiments, the resource pool modeled by the resource pool object 564 can be implemented as a virtual machine catalog.

By way of further example, the resource pool modeled by the resource pool object 566 is shown to include: (a) virtual desktops represented by the virtual desktop object 572 and the virtual desktop object 574; and (b) a virtual application represented by the virtual application object 576. In some embodiments, the resource pool modeled by the resource pool object 566 can be a collection of resources (e.g., desktops and applications) to which a common group of users are granted access.

At runtime, when components of the VDI-TM are deployed, runtime dependencies can be discovered and made a part of the VDI-TM instance 598b. For example, when the virtual desktop modeled by the virtual desktop object 572 and the virtual application instance modeled by the virtual application instance object 580 are deployed on the virtual machine modeled by the machine object 568, runtime dependencies 590(1) and 590(2), respectively, can be discovered therebetween. Similarly, when the virtual desktop modeled by the virtual desktop object 574 is deployed on the virtual machine modeled by the machine object 570, a runtime dependency 590(3) can be discovered therebetween. Furthermore, as a result of resources of the resource pool modeled by the resource pool object 566 being deployed on resources of the resource pool modeled by the resource pool object 564, a runtime dependency 590(4) can be discovered between the resource pool object 566 and the resource pool object 564.

In addition, the session object 578 models a user session in the VDI environment modeled by the VDI environment object 562. Additional runtime dependencies can be discovered as a result from the user session. As illustrated, the user session modeled by the session object 578 utilizes an instance of the virtual application modeled by the virtual application object 576, which instance is modeled by the virtual application instance object 580. Thus, runtime dependencies 590(5) and 590(6) can be discovered between the session object 578 and each of the virtual desktop object 574 and the virtual application object 576, respectively. Also, because the user session is initiated by (or corresponds to) a user modeled by the user object 582, a runtime dependency 590(7) can be discovered between the user object 582 and the session object 578.

The AG-TM instance 598c is shown to include a plurality of interrelated topology objects, specifically, an access gateway object 584 and a session object 586. The access gateway object 584 can model an access gateway that serves, for example, as a single-point-of-access to the VDI environment modeled by the VDI environment object 562. The session object 586 can modeled an interactive information interchange conversation between a user information handling system and resources of the VDI environment modeled by the VDI environment object 562.

In certain embodiments, inter-model dependencies across the PVI-TM instance 598a, the VDI-TM instance 598b and the AG-TM instance 598c can be discovered and made part of the ITM instance 598. At least some objects of each of the PVI-TM instance 598a, the VDI-TM instance 598b and the AG-TM instance 598c can be determined to refer to same components based, at least in part, on a comparison of object properties. For example, as illustrated, inter-model dependencies 536(1), 536(2) and 536(3) (collectively, inter-model dependencies 536) can be discovered between the VDI-TM instance 598b and the PVI-TM instance 598a. Also, inter-model dependency 538 can be discovered between the AG-TM instance 598c and the PVI-TM instance 598a. In the illustrated embodiment, the inter-model dependencies 536 and the inter-model dependency 538 are used to link corresponding components in distinct topology models.

In particular, as noted above, the hypervisor connection object 560 models a connection to a hypervisor that manages the VDI environment modeled by the VDI environment object 562. In the example of FIG. 5, the hypervisor management server object 542 models the hypervisor that manages the VDI environment; thus, the inter-model dependency 536(1) can be discovered between the hypervisor connection object 560 and the hypervisor management server object 542. Also, in the example of FIG. 5, the machine objects 568 and 570 correspond to and model the same virtual machines as the virtual machine objects 554 and 556, respectively. Therefore, the inter-model dependency 536(2) can be discovered between the machine object 568 and the machine object 554; similarly, the inter-model dependency 536(3) can be discovered between the machine object 570 and the virtual machine object 556. In addition, in the example of FIG. 5, the session object 586 and the session object 578 relate to a same user session. Consequently, the inter-model dependency 538 can be discovered between the session object 586 and the session object 578.

In the illustrated embodiment, an end-to-end path can be created as a result of the dependencies of the ITM instance 598 (illustrated via shading in FIG. 5). In particular, the illustrated end-to-end path includes the physical host object 552, the virtual machine object 556, the machine object 570, the virtual desktop object 574, the session object 578 and the session object 586.

Figure 6:
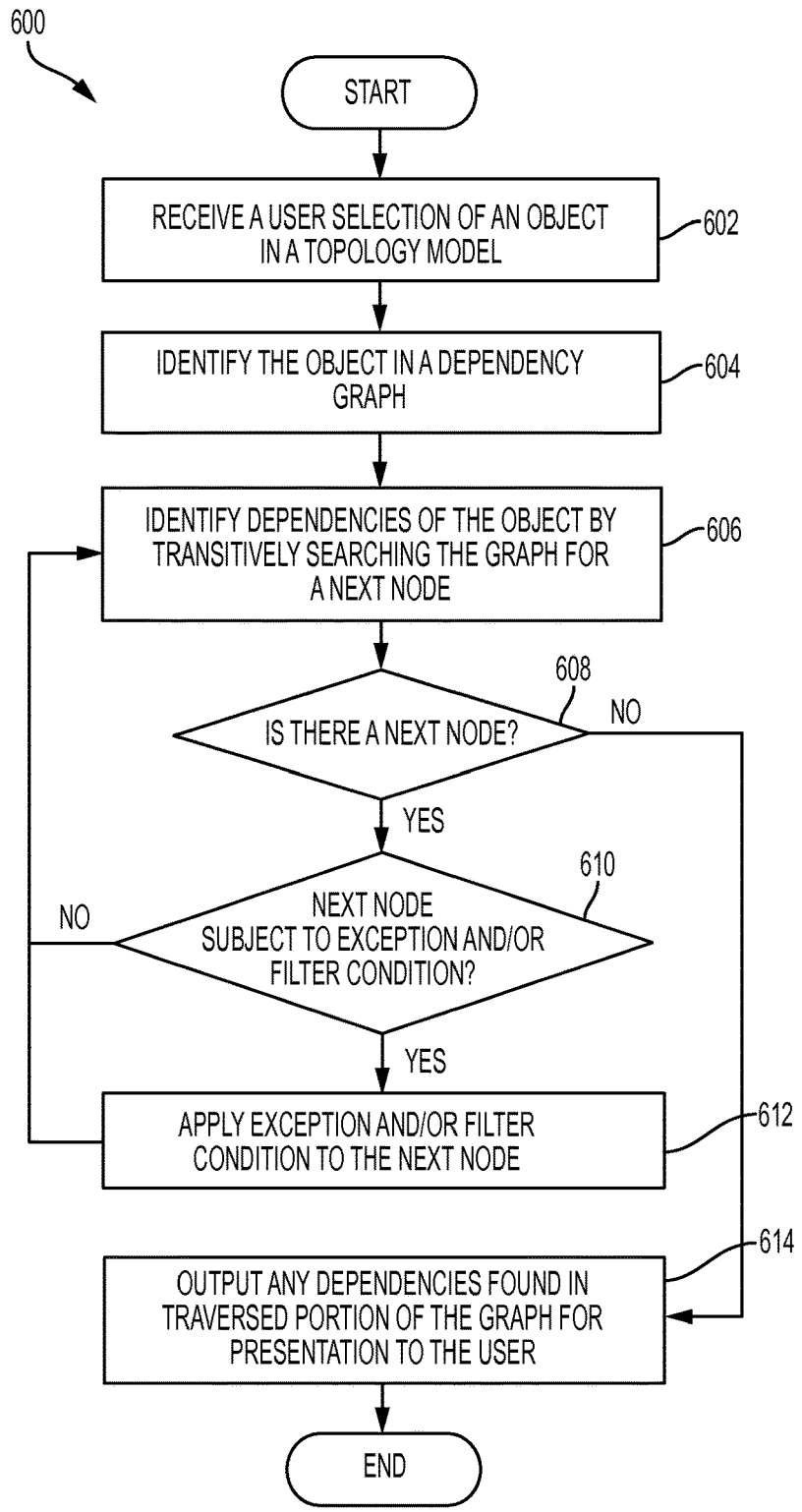
FIG. 6 illustrates an example dependency view process.

FIG. 6 illustrates an example dependency view process 600 is shown. The dependency view process 600 can be implemented by the computing management system 110. A computing system other than the computing management system 110 of FIG. 1 could also implement the dependency view process 600. For convenience, however, the process 600 will be described with respect to the computing management system 110. The dependency view process 600 can advantageously provide custom dependency views to users. The dependency view process 600 is described as being initiated by a user selection of an object for which dependencies may be retrieved. However, embodiments of the dependency view process 600 may also be initiated without user input.

The process 600 begins at block 602, where the dashboard user interface module 150 receives a user selection of an object in a topology model. The user selection can be provided in response to first outputting one or more topology objects for display to the user. In another embodiment, a menu of available types of topology objects can first be output for display to the user, from which the user can make the selection of a topology object or type of topology object. Subsequently, the custom filter module 146 can apply one or more filters, including custom filters, to obtain dependencies related to the selected object.

At block 604, the custom filter module 146 can identify the object in a dependency graph. The custom filter module 146 can identify dependencies of the object by transitively searching the graph for a next node (where each node represents an object) at block 606. If there is a next node (block 608), the custom filter module 146 can evaluate whether the next node is subject to an exception and/or filter condition at block 610. If so, the custom filter module 146 applies the exception and/or filter condition at block 612. For example, if the initially selected object was a process and the next node is an operating system associated with that process, the custom filter module 146 can determine whether an exception exists in the registry for skipping operating systems in a dependency tree. As another example, if a custom filter specifies that host dependencies are to be obtained, the custom filter module 146 may skip nodes in the dependency graph that correspond to objects other than hosts.

If there is no applicable exception or filter condition, the process 600 can loop back to block 606, where the custom filter module 146 searches for a next node. If there is no next node at block 608, the dashboard user interface module 150 outputs any dependencies found in the traversed portion of the dependency graph for presentation to the user at block 614.

In various embodiments, a monitoring system can track and trace end-user (EU) transactions during a VDI session, sometimes referred to herein as session transactions. The monitoring system can produce and store, for example, an end-to-end (E2E) response time for each session transaction. A session transaction is typically initiated, for example, by a user-initiated request (e.g., user action on a virtual application or virtual desktop via an input device such as a mouse, touchscreen or keyboard), includes subsequent processing of the request by a backend-computing system, and is concluded by a response from the VDI solution. As will be described in greater detail below, session transactions can cross multiple nodes.

Various embodiments described herein can facilitate a comparative performance analysis between acceptable user sessions and unacceptable user sessions. For example, in certain embodiments, each user session can be associated with either an acceptable category or an unacceptable category based, at least in part, on whether a latency measure for the session exceeds a configurable threshold. In various embodiments, the latency measure can be based on end-to-end (E2E) response times for EU transactions during the session (e.g., mean, median and modal values for E2E response time). The configurable threshold can be an absolute value (e.g., defined in seconds), a relative value (e.g., defined relative to a mean or median of such values across a group of sessions), and/or the like.

For purposes of aggregate analysis, an execution-time pair can be separately determined for each node along an E2E session path. The execution-time pair can include, for example, a first aggregate execution time for a group of user sessions associated with the acceptable category and a second aggregate execution time for a group of user sessions associated with the unacceptable category. Each aggregate execution time can represent a mean, median, mode, etc. Other methods of aggregation can also be used. Advantageously, in certain embodiments, this method enables simplified analysis of each node's performance in unacceptable user sessions as compared with that same node's performance in acceptable user sessions. In certain embodiments, when each node of the E2E session path is presented in this manner, it can more easily be determined which node or nodes are causes of the unacceptable sessions.

Figures 7A, 7B:
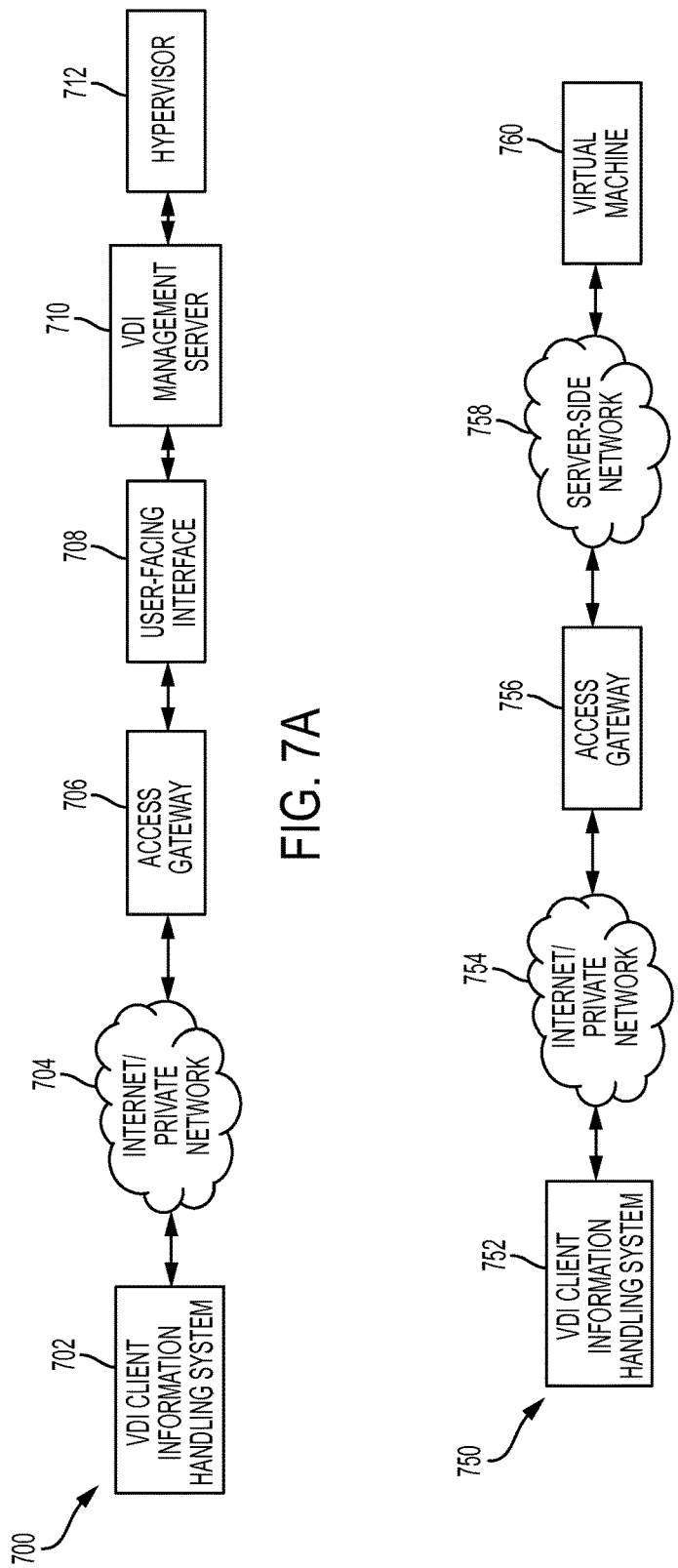
FIG. 7A illustrates an example of an end-to-end session-brokering path.
FIG. 7B illustrates an example of an end-to-end path for a connected virtual desktop infrastructure (VDI) session.

FIG. 7A illustrates an example of an E2E session-brokering path 700. In certain embodiments, the E2E session-brokering path 700 can be representative of a path that is utilized when a user session in a VDI environment is brokered. The E2E session-brokering path 700 includes a VDI client information handling system 702, a client-side network 704, an access gateway 706, a user-facing interface 708, a VDI management server 710 and a hypervisor 712. The VDI client information handling system 702, under control of a user, can access the access gateway 706 over the client-side network 704, which network can include the Internet.

The access gateway 706 typically serves as a single point-of-access for the VDI environment. The user-facing interface 708 can be an application, data store and/or other components that allow resources to which users have access, such as virtual desktops and other applications, to be aggregated and presented to users. The VDI management server 710 can serve a brokering function. For example, the VDI management server 710, in combination with other components, can facilitate authentication of the VDI client information handling system 702 and provide the user-facing interface with an authorized list of named resources, such as virtual desktops and virtual applications, based at least partly on user identity and other network and security attributes.

Upon the VDI client information handling system 702 requesting connectivity to a particular named resource, the VDI management server 710 can also be responsible for resolving the named resource to an actual network address that the VDI client information handling system 702 can use to establish a connection. For example, the hypervisor 712 can provision a virtual machine on which the VDI management server 710 deploys the requested resource. In general, each node of the E2E session-brokering path 700 can be modeled using a topology object or a collection of topology objects of an ITM such as the ITM instance 598 of FIG. 5. As will be described in greater detail below, each node of the E2E session-brokering path 700 can be a source of latency.

FIG. 7B illustrates an example of an E2E path 750 for a connected VDI session. The E2E path 750 includes a VDI client information handling system 752, a client-side network 754, an access gateway 756, a server-side network 758 and a virtual machine 760. In a typical embodiment, the E2E path 750 represents a user session that has been brokered as generally described with respect to FIG. 7A.

Figure 8:
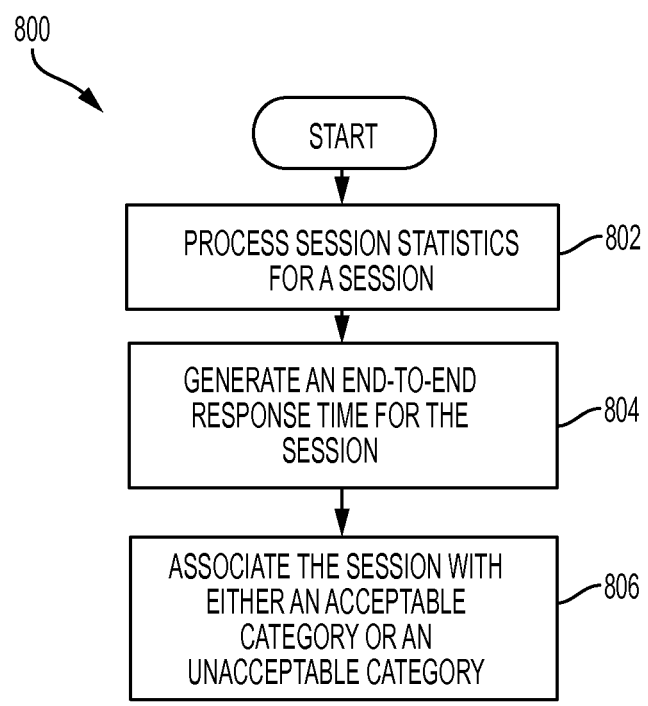
FIG. 8 illustrates an example of a process for determining an acceptability categorization of a user session.

FIG. 8 illustrates an example of a process 800 for determining an acceptability categorization of a user session. In various embodiments, the process 800 can be performed for each active user session handled by a VDI solution, each user session that is active during a specified timeframe, combinations of same, and/or the like. In certain embodiments, the process 800 can be triggered on-demand by an administrator, super user or other user. The process 800 can be implemented by any system that can process data. For example, the process 800, in whole or in part, can be implemented by one or more of the topology engine 130, the computing management system 110 and/or the data store 160 of FIG. 1. In some cases, the process 800 can be performed generally by the computing environment 100. Although any number of systems, in whole or in part, can implement the process 800, to simplify discussion, the process 800 will be described in relation to particular components or systems of the computing environment 100 of FIG. 1.

At block 802, the computing environment 100 processes information related to a user session. For example, the block 802 can include receiving monitoring data from the computing management system 110. At block 804, the computing management system 110, or another component, generates a latency measure for the user session. For example, the latency measure can be an aggregate E2E response time for session transactions during the session for an E2E session path (e.g., mean, median, mode, etc.). The E2E session path can be similar, for example, to the E2E session-brokering path 700 of FIG. 7A (e.g., if analyzing session-brokering latency) and/or the E2E path 750 of FIG. 7B (e.g., if analyzing latency in connected sessions).

At block 806, the computing management system 110, the dashboard user interface module 150 or another component associates the user session with either an acceptable category or an unacceptable category. For example, in certain embodiments, the user session can be associated with the unacceptable category if the latency measure exceeds a configurable threshold value. Otherwise, the user session can be associated with the acceptable category. The configurable threshold can be an absolute value (e.g., defined in seconds), a relative value (e.g., defined relative to a mean or median value for a group of sessions), and/or the like. The configurable threshold can also be varied by type of session analysis (e.g., session brokering as described with respect to FIG. 7A, session latency for a connected session as described with respect to FIG. 7B, etc.). The association can also be stored, for example, in the data store 160, in memory of the computing management system 110, etc.

Figure 9:
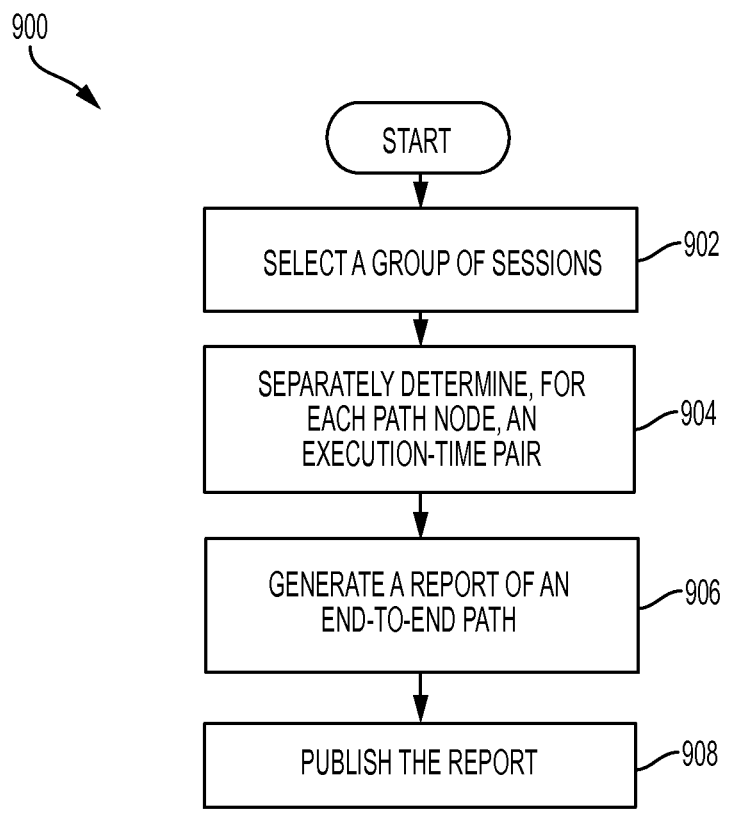
FIG. 9 illustrates an example of a process for comparing latency measures between acceptable and unacceptable sessions.

FIG. 9 illustrates an example of a process 900 for comparing latency measures between acceptable and unacceptable sessions. The process 900 can be implemented by any system that can process data. For example, the process 900, in whole or in part, can be implemented by one or more of the topology engine 130, the computing management system 110 and/or the data store 160 of FIG. 1. In some cases, the process 900 can be performed generally by the computing environment 100. Although any number of systems, in whole or in part, can implement the process 900, to simplify discussion, the process 900 will be described in relation to particular components or systems of the computing environment 100 of FIG. 1.

At block 902, the dashboard user interface module 150 selects a group of user sessions that have a common E2E session path (e.g., a session path of the form described with respect to FIG. 7A, a session path of the form described with respect to FIG. 7B, etc.). The E2E session path includes a plurality of session-path nodes such as those described with respect to FIG. 7A or FIG. 7B. For example, in some embodiments, the selected group may be all user sessions over a certain period of time, all user sessions of a particular user or group of users, combinations of same, and/or the like. In certain embodiments, the group of user sessions can be sessions for which a process similar to the process 800 of FIG. 8 has been executed. In some embodiments, the selection can be automated. In other embodiments, the selection can be responsive to user input, for example, from an administrative user or super user.

At block 904, the dashboard user interface module 150 separately determines an execution-time pair for each session-path node of the E2E session path. In general, the execution-time pair includes two aggregate representations. A first aggregate representation can be indicative of execution time by the session-path node of those sessions of the group that are deemed unacceptable sessions. A second aggregate representation can be indicative of execution time by the session-path node of those sessions of the group that are deemed acceptable sessions. An example of functionality that can be performed at the block 904 will be described in greater detail with respect to FIG. 5.

At block 906, the dashboard user interface module 150 generates a report of the E2E session path. The report can be considered a breakdown, across the plurality of session-path nodes, of an aggregate E2E response time for the group. In general, the report indicates, or summarizes, each determined execution-time pair in relation to a corresponding session-path node. In certain embodiments, the report can be a visualization of the E2E session path. In these embodiments, the visualization may depict each determined execution-time pair in relation to the corresponding session-path node. In certain other embodiments, the report can be a collection of data representative of each determined execution-time pair and its corresponding session-path node.

At block 908, the dashboard user interface module 150 publishes the report. For example, the report can be transmitted to a system, entity, or user. In embodiments in which the report is a visualization, the block 908 can include causing the visualization to be displayed, for example, to an administrative of user of an EU information handling system. In some embodiments, publishing the report can include transmitting the report to another system for analysis. For example, in some cases, the report can be used to make automatic scaling decisions in a shared-resource environment such as, for example, a cloud environment.

Figure 10:
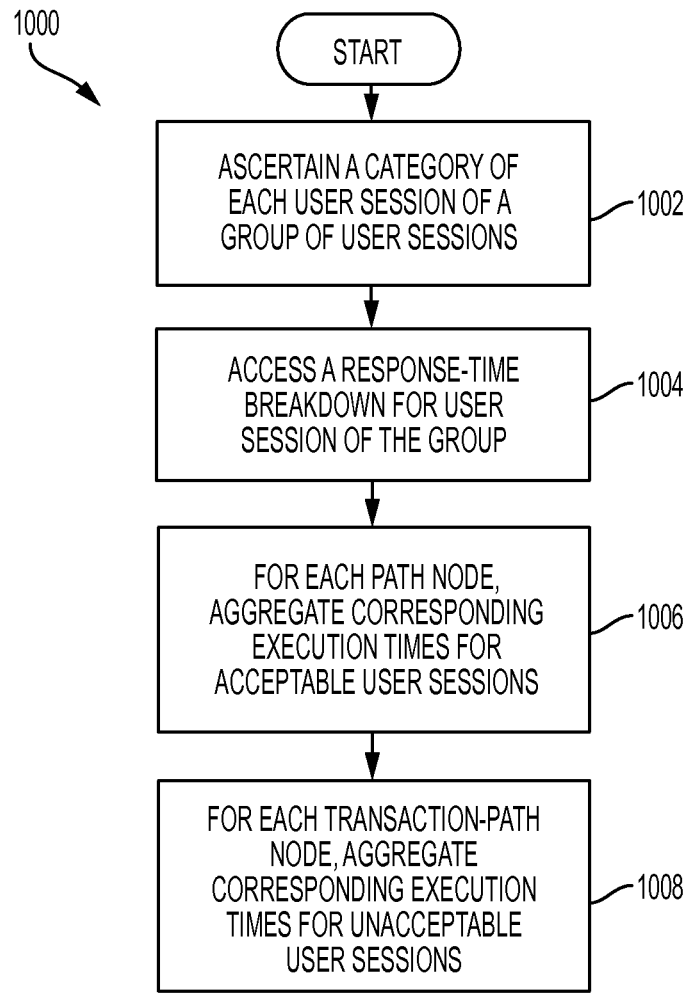
FIG. 10 illustrates an example of a process for separately determining an execution-time pair for each session-path node of a session path.

FIG. 10 illustrates an example of a process 1000 for separately determining an execution-time pair for each session-path node of a session path. In various embodiments, the process 1000 can be performed as all or part of the block 904 of FIG. 9. For example, the process 1000, in whole or in part, can be implemented by one or more of the topology engine 130, the computing management system 110 and/or the data store 160 of FIG. 1. In some cases, the process 1000 can be performed generally by the computing environment 100. Although any number of systems, in whole or in part, can implement the process 1000, to simplify discussion, the process 1000 will be described in relation to particular components or systems of the computing environment 100 of FIG. 1.

At block 1002, the dashboard user interface module 150 ascertains a category of each user session of a group of user sessions. The group can be, for example, a group that is selected as described with respect to the block 902 of FIG. 9. In certain embodiments, the category can be one of two categories: an acceptable category and an unacceptable category. Each category can be ascertained, for example, by accessing the data store 160 or other memory.

At block 1004, the dashboard user interface module 150 accesses a response-time breakdown for each user session of the group. Each response-time breakdown typically includes an execution time for each session-path node of the session path. At block 1006, for each session-path node, the dashboard user interface module 150 aggregates corresponding execution times for those user sessions of the group that are associated with the acceptable category. The aggregation can include computing a mean, median, or mode, performing a statistical analysis, or aggregating in another suitable fashion. At block 1008, for each session-path node, the dashboard user interface module 150 aggregates corresponding execution times for those user sessions of the group that are associated with the unacceptable category. The aggregation at the block 1006 can be performed in similar fashion to the aggregation at the block 1004.

Figure 11:
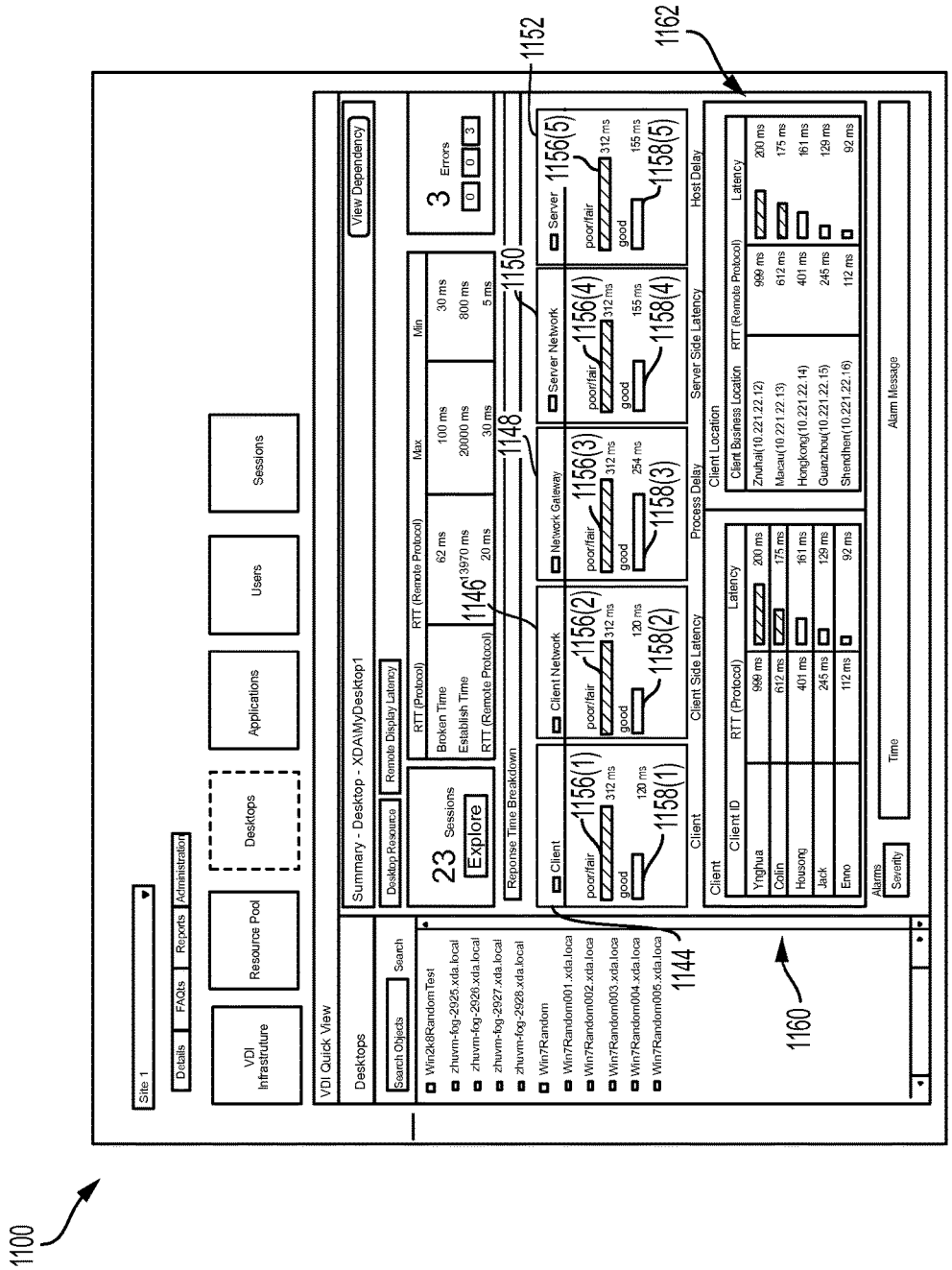
FIGS. 11-14 illustrate examples of user interfaces.

FIG. 11 illustrates an example of a user interface 1100. In various embodiments, the user interface 1100 can be generated or provided by a dashboard user interface such as the dashboard user interface module 150 of FIG. 1. As illustrated, the user interface 1100 shows a response-time breakdown across an E2E session path that includes a client 1144, a client-side network 1146, an access gateway 1148 (referred to as "Network Gateway"), a server-side network 1150, and a server 1152.

More particularly, the user interface 1100 illustrates unacceptable-category aggregate representations 1156(1)-(5) (collectively, unacceptable-category aggregation representations 1156) and acceptable-category aggregate representations 1158(1)-(5) (collectively, acceptable-category aggregation representations 1158) as described with respect to the block 404 of FIG. 4. The unacceptable-category aggregate representation 656(1) and the acceptable-category aggregate representation 658(1) may be considered an execution-time-pair as described above for the client 1144. As illustrated, each of the client-side network 1146, the client-side network 1146, the access gateway 1148, the server-side network 1150 and the server 1152 similarly have execution-time pairs.

Figure 12:
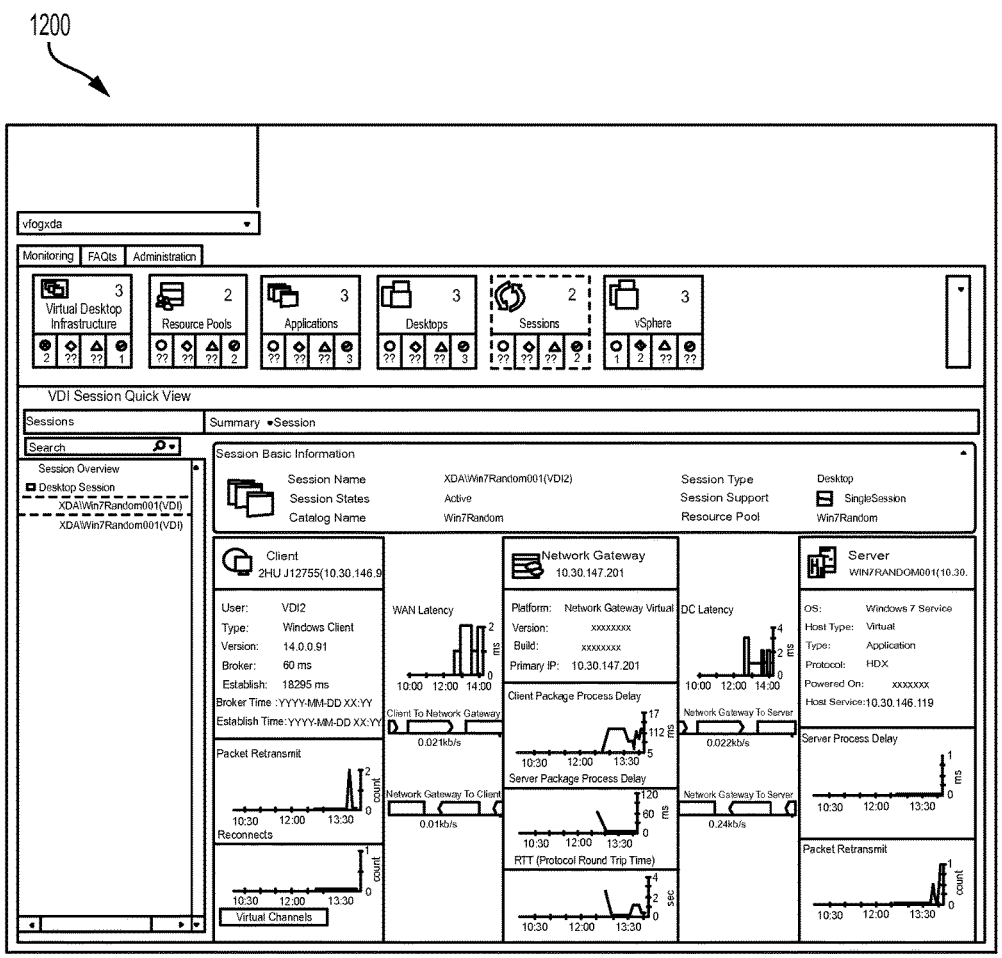

FIG. 12 illustrates an example of a user interface 1200. In various embodiments, the user interface 1200 can be generated or provided by a dashboard user interface such as the dashboard user interface module 150 of FIG. 1. In particular, FIG. 12 shows end-to-end session data for a particular user session. In various embodiments, the user interface 1200 can result from user selection of an "explore" button depicted in the user interface 1100.

Figure 13:
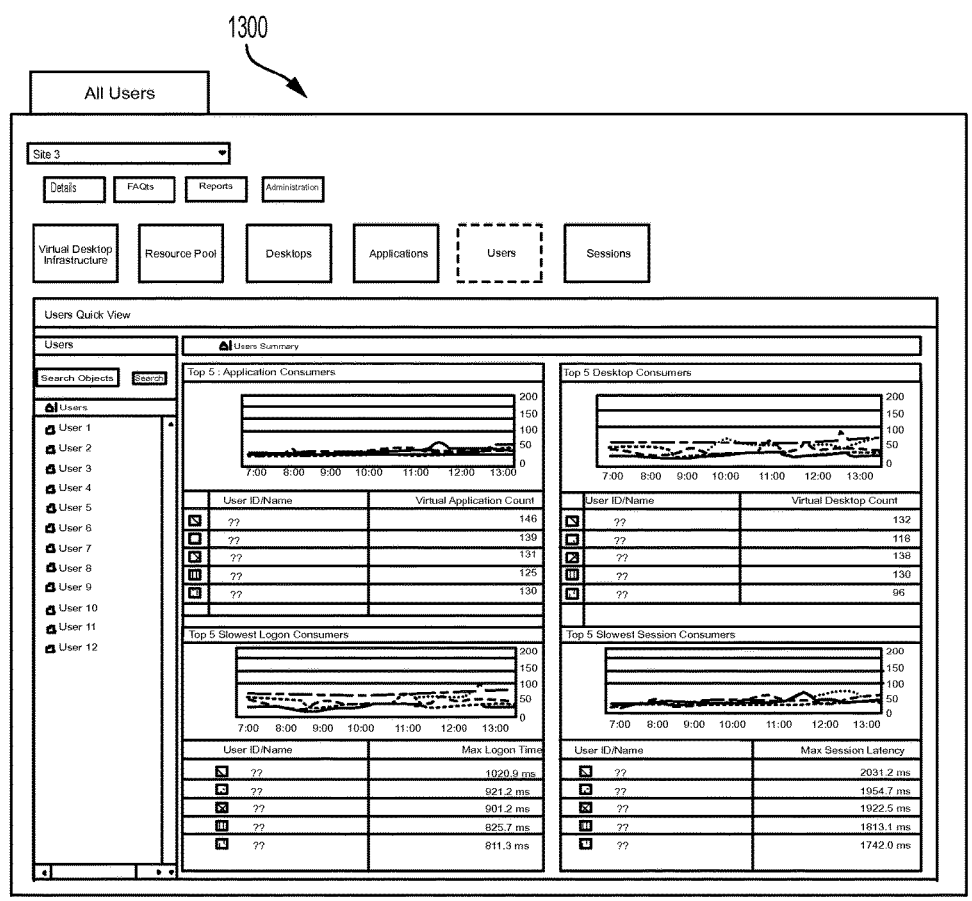

FIG. 13 illustrates an example of a user interface 1300. In various embodiments, the user interface 1300 can be generated or provided by a dashboard user interface such as the dashboard user interface module 150 of FIG. 1. In particular, FIG. 13 illustrates a user interface 1100 that provides monitoring data for all users across a set of users. In a typical embodiment, the monitoring data is collected according to an ITM as described above.

Figure 14:
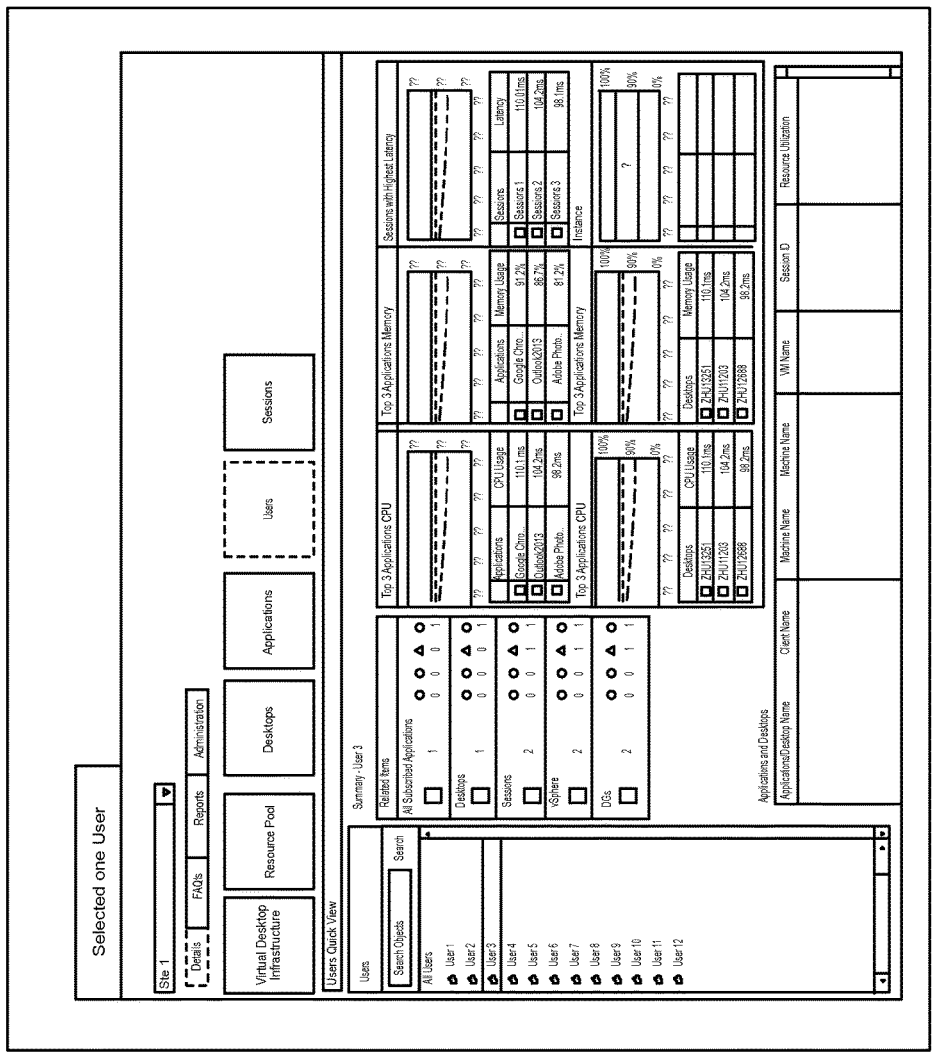

FIG. 14 illustrates an example of a user interface 1400. In various embodiments, the user interface 1400 can be generated or provided by a dashboard user interface such as the dashboard user interface module 150 of FIG. 1. In particular, FIG. 14 illustrates a user interface 1400 that provides monitoring data for a particular user of a set of users.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Some or all of the features described herein are sufficiently mathematically or technically complex that one or more computing devices may be necessary to carry them out. Thus, for example, the various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system:
    at runtime, in a multilayered computing environment that supports a virtual desktop infrastructure (VDI) solution, receiving real-time monitoring data from a plurality of monitored resources in the multilayered computing environment, the plurality of monitored resources comprising:
        a plurality of monitored physical resources;
        a plurality of monitored virtual resources;
        a plurality of monitored VDI resources; and
        a plurality of monitored network resources that handle VDI-related network traffic;
    at runtime, responsive to the receiving, transforming the real-time monitoring data into an integrated topology model (ITM) instance of interconnected topology objects, the ITM instance comprising instances of separate topology models, the instances comprising:
        a physical-and-virtual infrastructure topology model (PVI-TM) instance comprising first interconnected topology objects, the first interconnected topology objects representing the plurality of monitored physical resources and the plurality of monitored virtual resources, wherein interconnections between the first interconnected topology objects reflect relationships therebetween;
        a VDI topology model (VDI-TM) instance comprising second interconnected topology objects, the second interconnected topology objects representing the plurality of monitored VDI resources of the VDI solution, wherein interconnections between the second interconnected topology objects reflect relationships between the plurality of monitored VDI resources of the VDI solution; and
        an access gateway topology model (AG-TM) instance comprising third interconnected topology objects, the third interconnected topology objects representing the plurality of monitored network resources that handle VDI-related network traffic, wherein interconnections between the third interconnected topology objects reflect relationships between the plurality of monitored network resources;

generating inter-model runtime dependencies between the interconnected topology objects of the ITM instance, wherein the dependencies comprise:
  a dependency of at least one of the third interconnected topology objects on at least one of the second interconnected topology objects; and
  a dependency of at least one of the second interconnected topology objects on at least one of the first interconnected topology objects;
generating a dependency graph for the multilayer VDI architecture based, at least in part, on the inter-model runtime dependencies; and
outputting at least a portion of the dependency graph for presentation to a user.

2. The method of claim 1, displaying at least a portion of the real-time monitoring data with the dependency graph.

3. The method of claim 1, wherein the generating inter-model runtime dependencies comprises determining at least some of the first interconnected topology objects and at least some of the second interconnected topology objects to refer to same components based, at least in part, on a comparison of object properties.

4. The method of claim 1, comprising:
selecting a group of sessions having a common end-to-end session path comprising a plurality of session-path nodes;
wherein each session of the group is associated with either an acceptable category or an unacceptable category based, at least in part, on an end-to-end response time;
separately determining, for each session-path node, an execution-time pair, the execution-time pair comprising:
  first aggregate information indicative of execution time by the session-path node for sessions associated with the acceptable category; and
  second aggregate information indicative of execution time by the session-path node for transactions associated with the unacceptable category;
generating a report of the common end-to-end session path; and
wherein the report indicates each determined execution-time pair in relation to a corresponding session-path node.

5. The method of claim 4, wherein:
the report comprises a visualization of the common end-to-end session path; and
wherein the visualization depicts each determined execution-time pair in relation to a corresponding session-path node.

6. The method of claim 5, comprising causing the common end-to-end session path to be displayed.

7. The method of claim 4, comprising, prior to the selecting, for each session of a plurality of sessions, associating the session with either the acceptable category or the unacceptable category.

8. The method of claim 4, wherein the separately determining comprises:
ascertaining a category of each session of the group;
accessing a response-time breakdown for each transaction of the group;
for each session-path node, aggregating corresponding execution times for the sessions associated with the acceptable category; and
for each session-path node, aggregating corresponding execution times for the sessions associated with the unacceptable category.

9. An information handling system comprising a hardware processor and memory, wherein the processor and the memory in combination are operable to implement a method comprising:
at runtime, in a multilayered computing environment that supports a virtual desktop infrastructure (VDI) solution, receiving real-time monitoring data from a plurality of monitored resources in the multilayered computing environment, the plurality of monitored resources comprising:
  a plurality of monitored physical resources;
  a plurality of monitored virtual resources;
  a plurality of monitored VDI resources; and
  a plurality of monitored network resources that handle VDI-related network traffic;
at runtime, responsive to the receiving, transforming the real-time monitoring data into an integrated topology model (ITM) instance of interconnected topology objects, the ITM instance comprising instances of separate topology models, the instances comprising:
  a physical-and-virtual infrastructure topology model (PVI-TM) instance comprising first interconnected topology objects, the first interconnected topology objects representing the plurality of monitored physical resources and the plurality of monitored virtual resources, wherein interconnections between the first interconnected topology objects reflect relationships therebetween;
  a VDI topology model (VDI-TM) instance comprising second interconnected topology objects, the second interconnected topology objects representing the plurality of monitored VDI resources of the VDI solution, wherein interconnections between the second interconnected topology objects reflect relationships between the plurality of monitored VDI resources of the VDI solution; and
  an access gateway topology model (AG-TM) instance comprising third interconnected topology objects, the third interconnected topology objects representing the plurality of monitored network resources that handle VDI-related network traffic, wherein interconnections between the third interconnected topology objects reflect relationships between the plurality of monitored network resources;
generating inter-model runtime dependencies between the interconnected topology objects of the ITM instance, wherein the dependencies comprise:
  a dependency of at least one of the third interconnected topology objects on at least one of the second interconnected topology objects; and
  a dependency of at least one of the second interconnected topology objects on at least one of the first interconnected topology objects;
generating a dependency graph for the multilayer VDI architecture based, at least in part, on the inter-model runtime dependencies; and
outputting at least a portion of the dependency graph for presentation to a user.

10. The information handling system of claim 9, the method comprising displaying at least a portion of the real-time monitoring data with the dependency graph.

11. The information handling system of claim 9, wherein the generating inter-model runtime dependencies comprises determining at least some of the first interconnected topology objects and at least some of the second interconnected topology objects to refer to same components based, at least in part, on a comparison of object properties.

12. The information handling system of claim 9, the method comprising:
  selecting a group of sessions having a common end-to-end session path comprising a plurality of session-path nodes;
  wherein each session of the group is associated with either an acceptable category or an unacceptable category based, at least in part, on an end-to-end response time;
  separately determining, for each session-path node, an execution-time pair, the execution-time pair comprising:
    first aggregate information indicative of execution time by the session-path node for sessions associated with the acceptable category; and
    second aggregate information indicative of execution time by the session-path node for transactions associated with the unacceptable category;
  generating a report of the common end-to-end session path; and
  wherein the report indicates each determined execution-time pair in relation to a corresponding session-path node.

13. The information handling system of claim 12, wherein:
  the report comprises a visualization of the common end-to-end session path; and
  wherein the visualization depicts each determined execution-time pair in relation to a corresponding session-path node.

14. The information handling system of claim 13, the method comprising causing the common end-to-end session path to be displayed.

15. The information handling system of claim 12, comprising, prior to the selecting, for each session of a plurality of sessions, associating the session with either the acceptable category or the unacceptable category.

16. The information handling system of claim 12, wherein the separately determining comprises:
  ascertaining a category of each session of the group;
  accessing a response-time breakdown for each transaction of the group;
  for each session-path node, aggregating corresponding execution times for the sessions associated with the acceptable category; and
  for each session-path node, aggregating corresponding execution times for the sessions associated with the unacceptable category.

17. A computer-program product comprising a non-transitory computer-usable medium having computer-readable program code embodied therein, the computer-readable program code adapted to be executed to implement a method comprising:
  at runtime, in a multilayered computing environment that supports a virtual desktop infrastructure (VDI) solution, receiving real-time monitoring data from a plurality of monitored resources in the multilayered computing environment, the plurality of monitored resources comprising:
    a plurality of monitored physical resources;
    a plurality of monitored virtual resources;
    a plurality of monitored VDI resources; and
    a plurality of monitored network resources that handle VDI-related network traffic;
  at runtime, responsive to the receiving, transforming the real-time monitoring data into an integrated topology model (ITM) instance of interconnected topology objects, the ITM instance comprising instances of separate topology models, the instances comprising:
    a physical-and-virtual infrastructure topology model (PVI-TM) instance comprising first interconnected topology objects, the first interconnected topology objects representing the plurality of monitored physical resources and the plurality of monitored virtual resources, wherein interconnections between the first interconnected topology objects reflect relationships therebetween;
    a VDI topology model (VDI-TM) instance comprising second interconnected topology objects, the second interconnected topology objects representing the plurality of monitored VDI resources of the VDI solution, wherein interconnections between the second interconnected topology objects reflect relationships between the plurality of monitored VDI resources of the VDI solution; and
    an access gateway topology model (AG-TM) instance comprising third interconnected topology objects, the third interconnected topology objects representing the plurality of monitored network resources that handle VDI-related network traffic, wherein interconnections between the third interconnected topology objects reflect relationships between the plurality of monitored network resources;
  generating inter-model runtime dependencies between the interconnected topology objects of the ITM instance, wherein the dependencies comprise:
    a dependency of at least one of the third interconnected topology objects on at least one of the second interconnected topology objects; and
    a dependency of at least one of the second interconnected topology objects on at least one of the first interconnected topology objects;
  generating a dependency graph for the multilayer VDI architecture based, at least in part, on the inter-model runtime dependencies; and
  outputting at least a portion of the dependency graph for presentation to a user.

18. The computer-program product of claim 17, the method comprising displaying at least a portion of the real-time monitoring data with the dependency graph.

19. The computer-program product of claim 17, wherein the generating inter-model runtime dependencies comprises determining at least some of the first interconnected topology objects and at least some of the second interconnected topology objects to refer to same components based, at least in part, on a comparison of object properties.

20. The computer-program product of claim 17, the method comprising:
  selecting a group of sessions having a common end-to-end session path comprising a plurality of session-path nodes;
  wherein each session of the group is associated with either an acceptable category or an unacceptable category based, at least in part, on an end-to-end response time;
  separately determining, for each session-path node, an execution-time pair, the execution-time pair comprising:
    first aggregate information indicative of execution time by the session-path node for sessions associated with the acceptable category; and
    second aggregate information indicative of execution time by the session-path node for transactions associated with the unacceptable category;

generating a report of the common end-to-end session path; and wherein the report indicates each determined execution-time pair in relation to a corresponding session-path node.

\* \* \* \* \*